(12) United States Patent
Zanter

(10) Patent No.: US 9,298,807 B1
(45) Date of Patent: Mar. 29, 2016

(54) TECHNIQUES FOR DYNAMIC PARTITIONING IN A DISTRIBUTED PARALLEL COMPUTATIONAL ENVIRONMENT

(71) Applicant: David Laverne Zanter, Chapel Hill, NC (US)

(72) Inventor: David Laverne Zanter, Chapel Hill, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 14/845,662

(22) Filed: Sep. 4, 2015

Related U.S. Application Data

(60) Provisional application No. 62/047,676, filed on Sep. 9, 2014.

(51) Int. Cl.
*G06F 17/30* (2006.01)
*H04L 12/26* (2006.01)
*H04L 12/721* (2013.01)

(52) U.S. Cl.
CPC .... *G06F 17/30598* (2013.01); *G06F 17/30876* (2013.01); *H04L 43/0805* (2013.01); *H04L 45/70* (2013.01)

(58) Field of Classification Search
CPC .......................... G06F 17/30575; G06F 9/3851
See application file for complete search history.

(56) References Cited

U.S. PATENT DOCUMENTS

| | | | | |
|---|---|---|---|---|
| 2008/0228408 A1* | 9/2008 | Reiss | ..... | G06F 19/18 702/19 |
| 2010/0269102 A1* | 10/2010 | Latorre | ..... | G06F 9/3842 717/130 |
| 2011/0078427 A1* | 3/2011 | Shebanow | ..... | G06F 9/327 712/244 |
| 2012/0047126 A1* | 2/2012 | Branscome | ..... | G06F 17/30519 707/714 |
| 2012/0159506 A1* | 6/2012 | Barham | ..... | G06F 9/5044 718/104 |
| 2014/0189711 A1* | 7/2014 | Luiz | ..... | G06F 9/4812 718/106 |
| 2014/0282566 A1* | 9/2014 | Lindholm | ..... | G06F 9/522 718/102 |

* cited by examiner

Primary Examiner — Mohammad S Rostami
(74) Attorney, Agent, or Firm — Kacvinsky Daisak Bluni PLLC

(57) ABSTRACT

An apparatus includes an organization component to retrieve from task instructions an indication of a type of organization of data set subportions prior to performance of a computation and a data item by which the data set subportions are to be organized, organize the data set subportion among others based on the data item and type of organization, monitor availability of a first processing resource and a first storage resource of a node device employed to organize the data set subportions, and based on insufficient availability of at least one of the first processing resource or the first storage resource, interrupt the organization of the data set subportions, and dispatch a first set of one or more organized data set subportions to be processed; and a performance component to execute the task instructions to process the organized data set subportion.

30 Claims, 22 Drawing Sheets

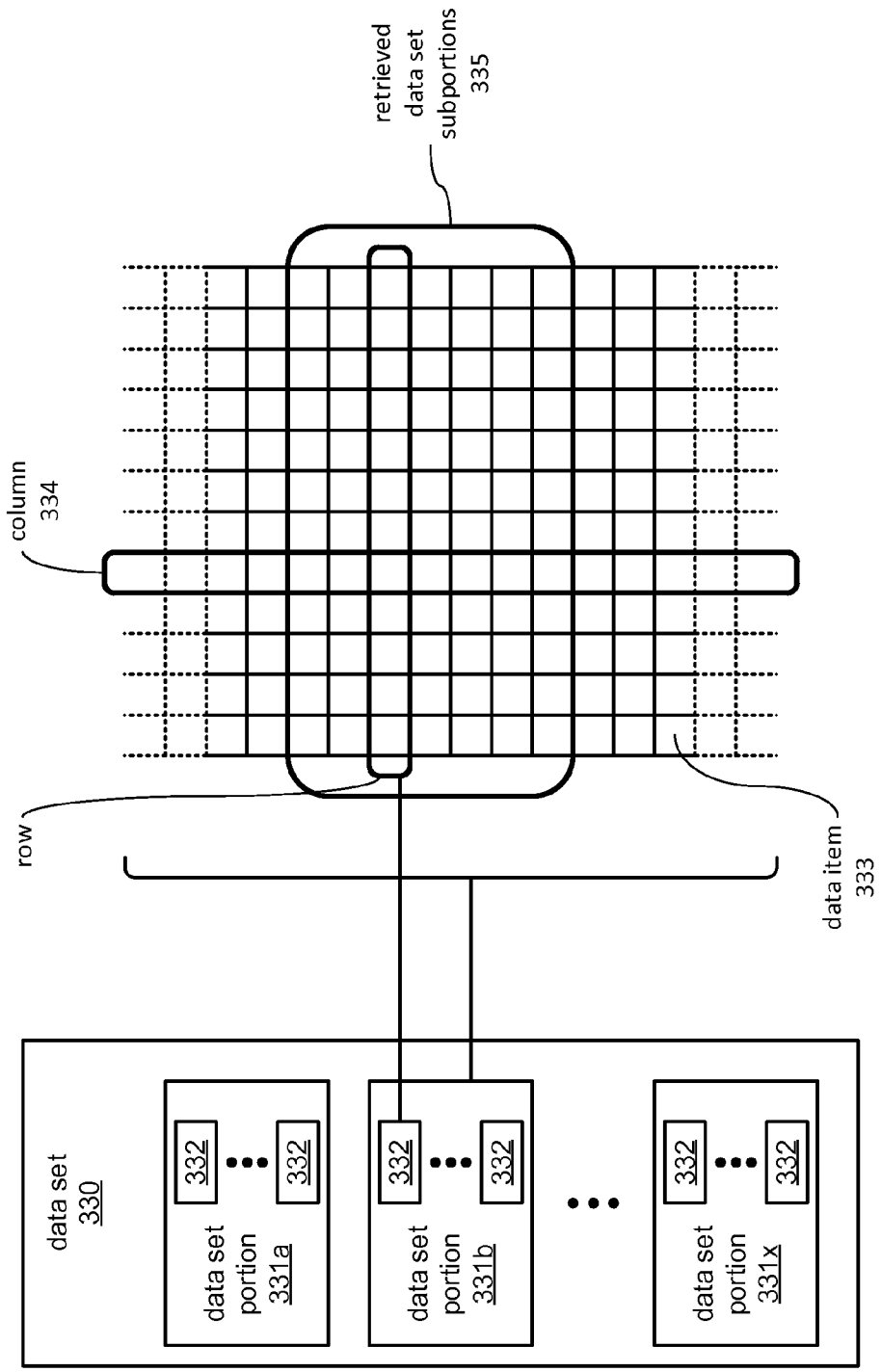

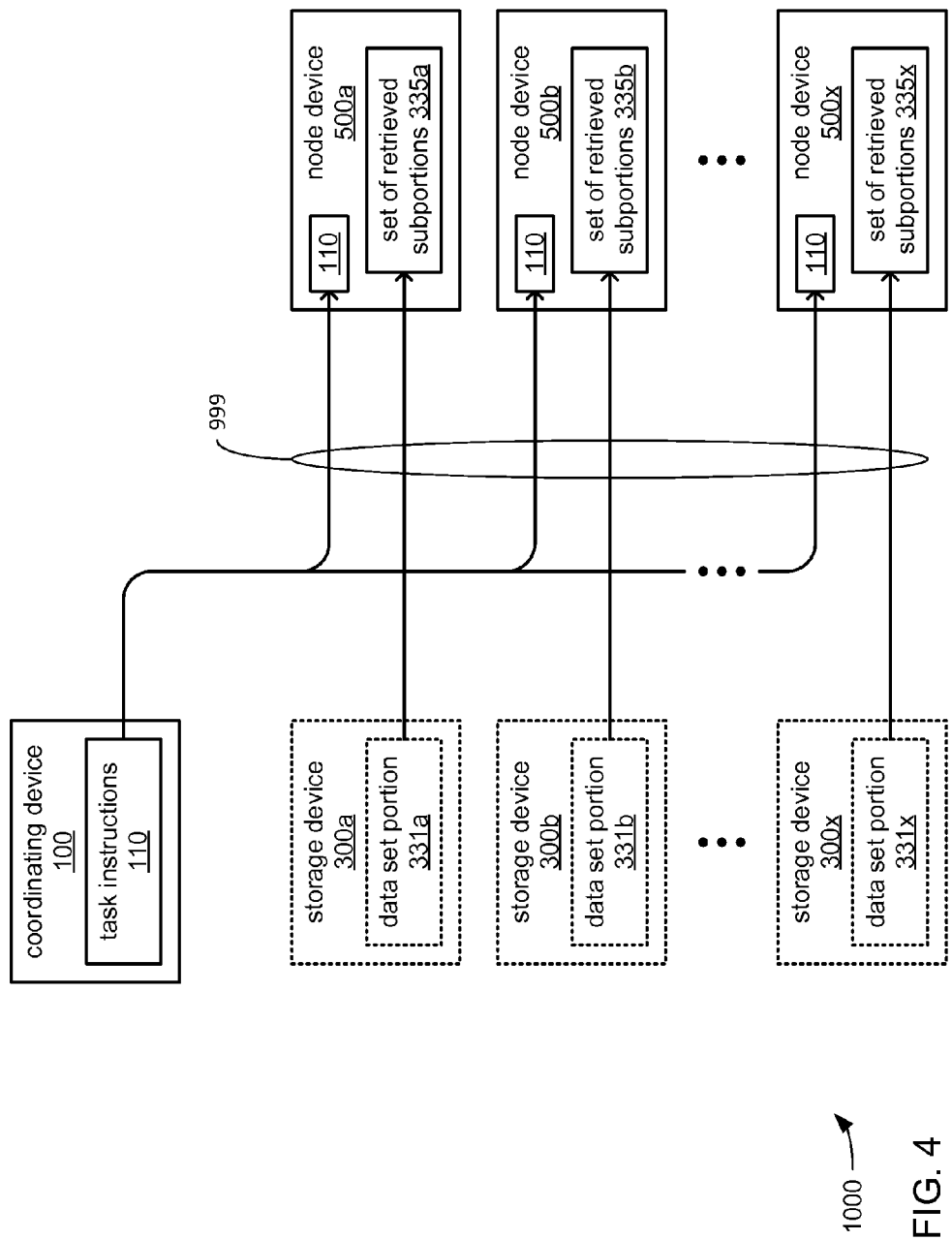

TECHNIQUES FOR DYNAMIC PARTITIONING IN A DISTRIBUTED PARALLEL COMPUTATIONAL ENVIRONMENT

CROSS-REFERENCE TO RELATED APPLICATIONS

This application claims the benefit of priority under 35 U.S.C. §119(e) to U.S. Provisional Application Ser. No. 62/047,676 entitled "METHOD FOR DYNAMIC PARTITION PROCESSING IN A DISTRIBUTED PARALLEL COMPUTATIONAL ENVIRONMENT" filed Sep. 9, 2014, the entirety of which is incorporated herein by reference.

BACKGROUND

The performance of a database calculation may result in the retrieval and handling of relatively large amounts of data from a data set by each of multiple node devices. This begets the challenge of controlling the allocation of limited resources available within each node device to handle such amounts of data while minimizing programming complexity.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

An apparatus includes a processor component and a network interface to couple the processor component to a network to receive task instructions to perform a computation with data set subportions within a data set portion as an input to the computation. The apparatus also includes an organization component for execution by the processor component to retrieve from the task instructions an indication of a type of organization required of the data set subportions prior to performance of the computation and a data item within each data set subportion by which the data set subportions are to be organized. The type of organization includes at least one of ordering or grouping the data set subportions of the data set portion by the data item. For each data set subportion of the data set portion, the organization component is to organize the data set subportion among others of the data set subportions within the data set portion based on the data item and the indicated type of organization, and monitor an availability of a first processing resource and a first storage resource of a node device employed to organize the data set subportion. Based on insufficient availability of at least one of the first processing resource or the first storage resource, the organization component is to interrupt the organization of the data set subportions, and dispatch a first set of one or more organized data set subportions to be processed. The apparatus further includes a performance component for execution by the processor component to, for each organized data set subportion of the first set, execute the task instructions to process the organized data set subportion. The apparatus still further includes a completion component for execution by the processor component to operate the network interface to transmit one or more processed data set subportions processed from the first set to another device via the network as part of aggregating the processed data set subportions with other processed data set subportions associated with another data set portion, and to trigger a return to organization of another data set subportion of the data set portion not yet organized by the organization component to generate a second set of one or more organized data set subportions.

The performance component may, for each organized data set subportion of the first set, monitor the availability of a second processing resource and a second storage resource of the node device employed in processing the organized data set subportion; and based on insufficient availability of at least one of the second processing resource and the second storage resource, interrupt the processing of the organized data set subportions of the first set, transmit a subset of the processed data set subportions processed from the first set to the other device, and return to processing each data set subportion of the first set not yet processed.

The completion component may, before transmission of the one or more processed data set subportions processed from the first set to the other device, determine whether a second set of organized data set subportions has been dispatched to be processed and determine whether the second set is indicated as a continuation of the first set; and operate the network interface to transmit the one or more processed data set subportions processed from the first set to the other device based on at least one of a determination that a second set has not been dispatched or that the second set is not a continuation of the first set. Based on a determination that the second set has been dispatched and is a continuation of the first set, the performance component may, for each organized data set subportion of the second set, execute the task instructions to process the organized data set subportion; and the completion component may operate the network interface to transmit the processed data set subportions processed from the first set combined with the processed data set subportion processed from the second set to the other device.

The organization component may, for each data set subportion of the data set portion to be organized into the second set, organize the data set subportion among others of the data set subportions within the data set portion based on the data item and the indicated type of organization, monitor the availability of the first processing resource and the first storage resource, and monitor an amount of data set subportions of the data set portion not yet organized; based on at least one of insufficient availability of the first processing resource, insufficient availability of the first storage resource or depletion of the amount of data set subportions of the data set portion not yet organized, interrupt the organization of the data set subportions into the second set, and dispatch the second set to be processed; based on the data item of each of the organized data set subportions of the second set, determine whether the second set is a continuation of the first set; and store an indication that the second set is a continuation of the first set based on the determination. The performance component may instantiate a second thread in which to execute the task instructions to process each organized data set subportion in the second set separately from a first thread in which the task instructions are executed to process each organized data set subportion in the first set based on a determination that the second set is not a continuation of the first set, and for each organized data set subportion of the second set, execute the task instructions within the second thread to process the organized data set subportion; and the completion component may transmit the processed data set subportions processed from the second set to the other device. The indicated type of organization may include ordering the data set subportions of the data set portion by the data item; and the organization component may determine whether the second set is a continuation of the first set based on whether a range of values of the data item in each organized data set subportion in the second set intersects with a range of values of the data item in each organized data set subportion in the first set. The indicated type of organization may include grouping the data set subportions of the data set portion into one or more groups that each share a different value for the data item; and the organization component may determine whether the second set is a continuation of the first set based on whether the value shared by a group of one or more organized data set subportions in the second set is also shared by a group of one or more organized data set subportions in the first set.

The completion component may receive processed data set subportions from another node device via the network, and transmit the processed data set subportions processed from the first set combined with the processed data set subportions received from the other node device to the other device.

A computer-program product tangibly embodied in a non-transitory machine-readable storage medium, the computer-program product including instructions operable to cause a processor component to perform operations including receive, at a node device, task instructions to perform a computation with data set subportions within a data set portion as an input to the computation; retrieve from the task instructions an indication of a type of organization required of the data set subportions prior to performance of the computation and a data item within each data set subportion by which the data set subportions are to be organized, wherein the type of organization comprises at least one of ordering or grouping the data set subportions of the data set portion by the data item; for each data set subportion of the data set portion, organize the data set subportion among others of the data set subportions within the data set portion based on the data item and the indicated type of organization, and monitor an availability of a first processing resource and a first storage resource of the node device employed to organize the data set subportion; based on insufficient availability of at least one of the first processing resource or the first storage resource, interrupt the organization of the data set subportions, and dispatch a first set of one or more organized data set subportions to be processed; for each organized data set subportion of the first set, execute the task instructions to process the organized data set subportion; transmit one or more processed data set subportions processed from the first set to another device via a network as part of aggregating the processed data set subportions with other processed data set subportions associated with another data set portion; and return to organizing another data set subportion of the data set portion not yet organized to generate a second set of one or more organized data set subportions.

A computer-implemented method includes receiving, at a node device, task instructions to perform a computation with data set subportions within a data set portion as an input to the computation; retrieving from the task instructions an indication of a type of organization required of the data set subportions prior to performance of the computation and a data item within each data set subportion by which the data set subportions are to be organized, wherein the type of organization comprises at least one of ordering or grouping the data set subportions of the data set portion by the data item; for each data set subportion of the data set portion, organizing the data set subportion among others of the data set subportions within the data set portion based on the data item and the indicated type of organization, and monitoring an availability of a first processing resource and a first storage resource of the node device employed in organizing the data set subportion; based on insufficient availability of at least one of the first processing resource or the first storage resource, interrupting the organization of the data set subportions, and dispatching a first set of one or more organized data set subportions to be processed; for each organized data set subportion of the first set, executing the task instructions to process the organized data set subportion; transmitting one or more processed data set subportions processed from the first set to another device via a network as part of aggregating the processed data set subportions with other processed data set subportions associated with another data set portion; and returning to organizing another data set subportion of the data set portion not yet organized to generate a second set of one or more organized data set subportions.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

BRIEF DESCRIPTION OF THE DRAWINGS

FIGS. 2A and 2B, together, illustrate an example embodiment of distribution of portions and subportions of a data set within a database system.

FIG. 4 illustrates an example of distributing task instructions.

DETAILED DESCRIPTION

Figure 1A:
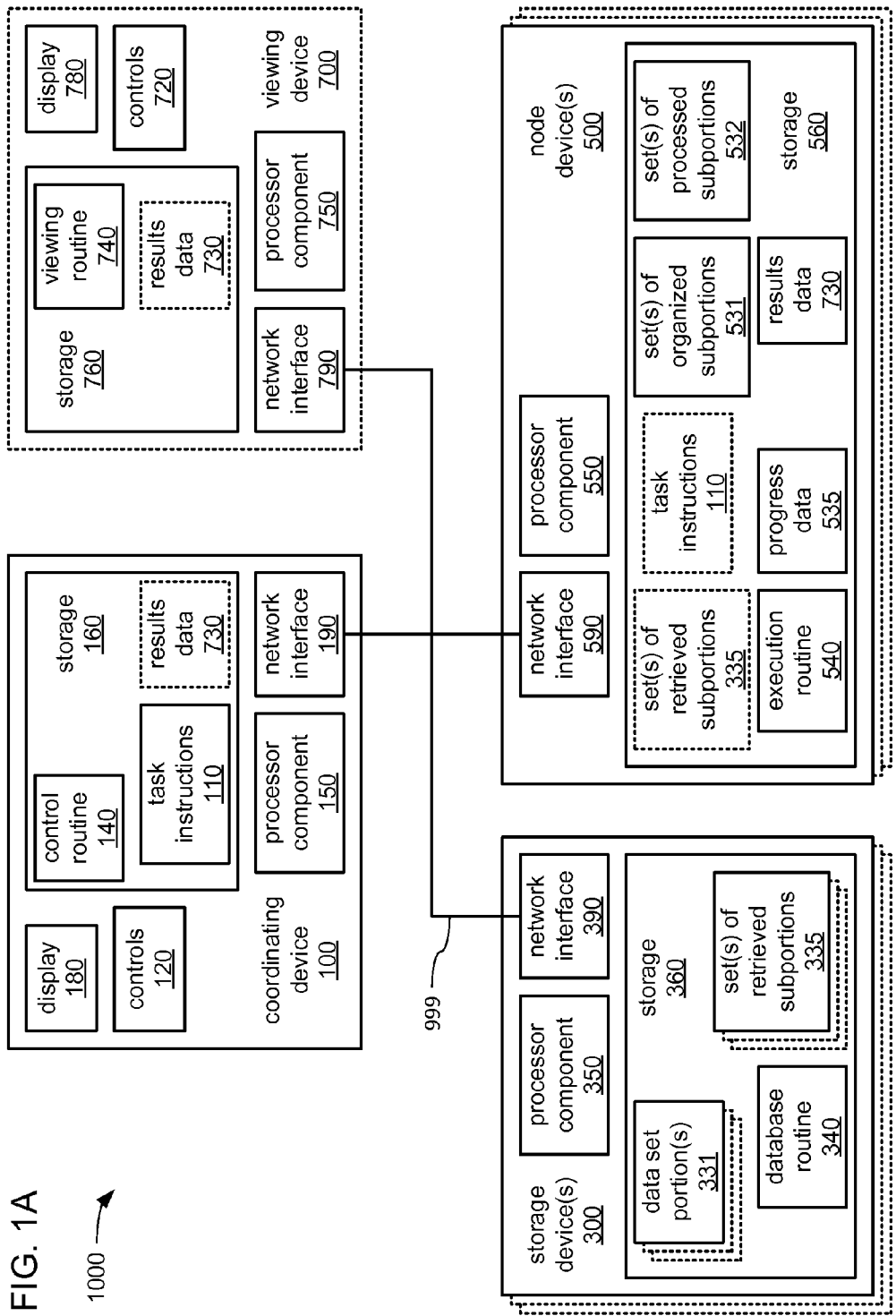
FIGS. 1A and 1B each illustrate an example embodiment of a database system.

Various embodiments described herein are generally directed to techniques for dynamically partitioning data retrieved from a data set based on resource limitations of one or more node devices of a database system. Competing uses of the node devices of a database system may result in the availability of an unpredictable quantity of node devices thereof to perform each new database calculation. Also, within each available node device, such competing uses may result in unpredictable degrees of availability of each resource provide by a node device that is required to perform a portion of a database calculation, including processing resources, memory space and/or network interface bandwidth. To address this, the organization and/or processing of data by each of the available node devices may be dynamically partitioned based on the resources available therein. More precisely, an amount of retrieved data that is organized and/or an amount of organized data that is processed within each such node device may be dynamically partitioned into multiple smaller amounts to address limits in available resources encountered during such organizing and/or processing.

A data set may be stored in a distributed manner among numerous devices linked by a network to provide at least the storage function of a database system. Stated differently, each of multiple devices of the database system may store a data set portion. However, in some database systems, a copy of each data set portion stored by one of those devices may additionally be stored by another of those devices as part of providing some degree of redundancy to prevent the loss of an entire data set portion due to device failure. Each of those data set portions may be made up of numerous data set subportions, and the manner in which each data set portion is divided into those data set subportions may be defined by the manner in which items of data are organized within the data set. By way of example, in a data set in which data items are organized into a two-dimensional array defined by rows and columns, each data set subportion may be a row of that two-dimensional array.

In some database systems, the devices that store the data set portions may be storage devices that are separate and distinct from the node devices of the database system that organize and process data set subportions retrieved from the data set portions as part of performing a database calculation. In other embodiments, the same node devices that organize and process such retrieved data set subportions may also serve as the storage devices that store the data set portions from which such data set subportions are so retrieved. Regardless of whether the node devices also store the data set portions, task instructions to perform a database calculation may be distributed among available ones of the node devices in preparation for each of those node devices performing part of the database calculation in a distributed manner in parallel with the others. The task instructions may include both instructions for the organization of data set subportions retrieved from the data set portions and instructions for the performance of the database calculation.

The performance of a database calculation may first require that the data set subportions from each data set portion be organized prior to processing. The task instructions may at least include an indication of one or more parameters for performing such organization, such as an indication of the type of organization to be performed. In some embodiments, multiple data set subportions may be retrieved from each data set portion and the task instructions may specify that those multiple data set subportions are to be organized in a specified order based on the data values of a specified data item present within each of those data set subportions. In such embodiments, the specified order may be a numerical order, an alphabetical order, etc., of the data values of that data item within each of those data set subportions. In other embodiments, the task instructions may specify that the multiple data set subportions retrieved from each data set portion are to be organized into groups within each node device based on the data values of a specified data item present within each of those data set subportions. Stated differently, in such other embodiments, data set subportions that share the same data value for that specified data item may be grouped together.

Following such organizing of data set subportions by ordering or grouping within each node device, the now organized data set subportions may then be processed within the node devices to perform the database calculation. The task instructions may include instructions executable by one or more processor components within each of the node devices to perform such processing. In various embodiments, the database calculation may be any of a variety of calculations using one or more data items within each data set subportion as inputs. Among the one or more data items within each data set subportion serving as an input may be the same data item by which the data set subportions may be ordered or grouped. Among the database calculations that may be performed may be relatively simple database calculations such as, and not limited to, determining the sum, average, minimum value or maximum value of one or more selected data items within each of the data set subportions. Alternatively or additionally, the database calculations that may be performed may be relatively complex database calculations such as, and not limited to, deriving a statistical copula and/or determining one or more probabilities based on one or more selected data items within each of the data set subportions.

However, the manner in which the data set is divided into the data set portions that are distributed among multiple devices of the database system for storage may be less than optimal for such organization and performance of database calculations using data set subportions retrieved therefrom. More specifically, one or more of the node devices may be provided with a quantity of data set subportions that is large enough to overwhelm the resources available within each of those node devices. By way of example, one or more of such node devices may have relatively limited processing resources, memory space and/or network interface bandwidth available to either organize or process data set subportions as a result of competition among multiple database operations for the use of those resources.

To address this, within each node device, execution of the task instructions may be monitored for instances in which the limits of a resource provided by that node device are about to be reached. More specifically, current levels of available resources within each node device may be recurringly compared to one or more thresholds to detect instances in which one or more of those levels falls below a threshold. Where such an instance occurs during the organization of data set subportions, the organization of data set subportions may be interrupted, and the ones of the data set subportions that have been organized may be dispatched as a set of organized subportions for processing within that node device to perform the database calculation thereon. With the dispatching of each set of organized subportions for processing to perform the database calculation, an indication may be stored within the node device of whether or not the next set just dispatched is able to be treated as a continuation of the last set of organized subportions that was so dispatched.

Where there is an indication that the next set of organized subportions just dispatched is able to be treated as a continuation of the last set to be dispatched, the next set may be combined with the last set in the processing of data set subportions as inputs to the database calculation performed within a single thread. However, where there is an indication that the next set of organized subportions is not able to be treated as a continuation of the last set, another thread may be instantiated and the next set may be separately processed on that other thread as an input to a separate performance of the database calculation on that other thread. In being processed in a separate performance of the database calculation on an entirely separate thread, the next set of organized subportions may be effectively treated as if it were dispatched to an entirely different node device for such a separate performance of the database calculation, despite the fact that the next set remains within the same node device.

By way of example, in embodiments in which the task instructions specify organizing the data set subportions into in an order based on the data values of a specified data item within each of the data set subportions (e.g., a numerical or alphabetical order of those data values), an indication may be stored of the range of data values for that data item that is included in each set of organized subportions that is dispatched for processing as inputs in performing the database calculation. In such embodiments, the range of data values for that specified data item for the next set of organized data set subportions may be compared to the range of data values for that specified data item for the last set of organized subportions to determine whether the range of data values for the next set continues in the order from the range of data values for the last set. If so, then the next set of organized subportions may be treated as a continuation of the last set such that the performance of the database calculation on the last set simply continues with the next set on the same thread. However, if not, then the next set of organized data set subportions may be dispatched as a separate input for a separate performance of the database calculation on a separate thread that may be instantiated for that separate performance.

By way of another example, in embodiments in which the task instructions specify organizing the data set subportions into groups based on the data values of a specified data item within each of the data set subportions, an indication may be stored of the data value for that data item that is common to all of the data set subportions in a set of organized subportions that is dispatched for a performance of the database calculation. In such embodiments, a data value for that data item that is common to all of the data set subportions in the next set of organized subportions may be compared to such a data value for the last set to determine whether those data values match. If so, then the next set of organized subportions may be treated as a continuation of the last set. However, if not, then the next set of organized data set subportions may be dispatched as a separate input for a separate performance of the database calculation on a separate thread that may be instantiated for that separate performance.

Where an instance of limits of a required resource provided by a node device are about to be reached during performance of the database calculation, further performance of the database calculation within that node device may be interrupted, and the ones of the data set subportions that have been both organized (e.g., ordered or grouped) and then processed as inputs to the database calculation may be dispatched as a set of processed subportions for aggregation of the results of the database calculation. Such dispatching may be to another node device or to still another device where such aggregation is performed. Such dispatching of a set of processed subportions for aggregation of the results of the database calculation may allow the data set subportions included in that set to be cleared from limited memory space and/or other limited resources of the node device such that further organizing and/or processing of data set subportions may resume.

The interrupting of organizing and/or processing of data set subportions in response to instances of there being too little availability of a resource may be controlled entirely by an execution routine that controls the execution of the task instructions by a processor component of a node device. As a result, the task instructions may not be required to include instructions for the handling of such instances, thereby allowing the functions encoded within the task instructions to be more focused on the performance of the database calculation.

With general reference to notations and nomenclature used herein, portions of the detailed description that follows may be presented in terms of program procedures executed by a processor component of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an example embodiment of a database system 1000 incorporating a coordinating device 100, one or more storage devices 300, one or more node devices 500, and/or a viewing device 700. As depicted, these devices 100, 300, 500 and/or 700 may exchange communications thereamong that convey task instructions 110 to perform a database calculation, one or more sets of retrieved subportions 335 to be organized and/or used as inputs to performances of the database calculation, and/or results data 730 indicating the results of the database calculation through a network 999. However, one or more of the devices 100, 300, 500 and/or 700 may exchange other data entirely unrelated to database calculations with each other and/or with still other devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The coordinating device 100 provides a user interface to an operator thereof by which the operator may provide the task instructions 110 setting forth a database calculation. The coordinating device 100 may then distribute the task instructions 110 among multiple ones of the node devices 500. The database calculation may be performed on a data set that may be divided into data set portions 331 that may be distributed among multiple ones of the storage devices 300 for storage. Performing the database calculation may entail retrieving multiple data set subportions from each of the data set portions 331 stored by a different one of the storage devices 300. The data set subportions retrieved from different ones of the data set portions 331 may then be provided to different ones of the node devices 500 in different sets of retrieved subportions 335 for use as inputs to the distributed performance of the database calculation among the node devices 500 in parallel. As will be explained in detail, the retrieved data set subportions provided in each set of retrieved subportions 335 may need to be organized into a specified order or into specified groups within each of the node devices 500 prior to their respective performances of the database calculation. Following those performances of the database calculation, the node devices 500 may cooperate to aggregate calculation results to generate the results data 730.

Figure 1B:
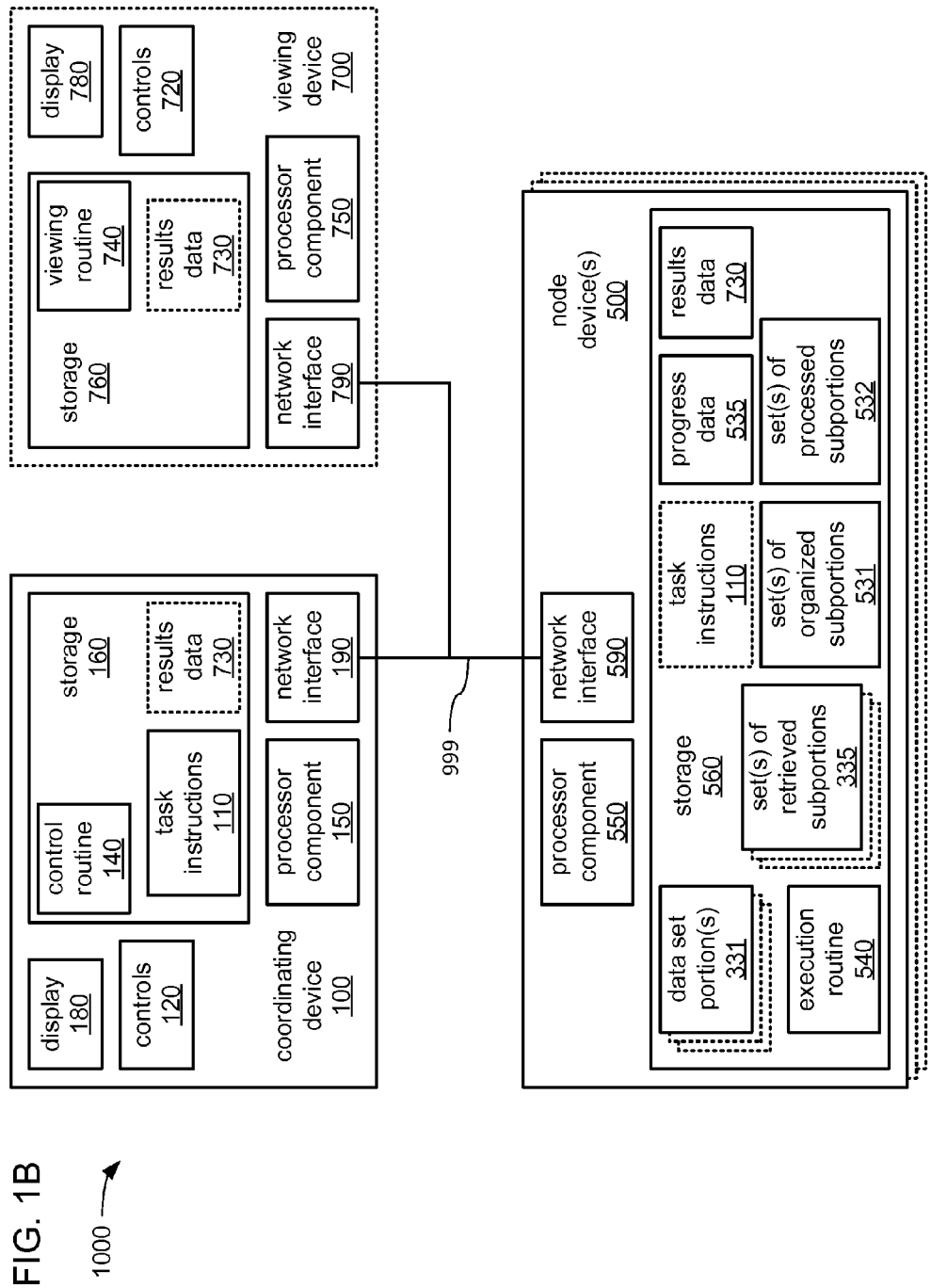

FIG. 1B illustrates a block diagram of an alternate example embodiment of the database system 1000 that is substantially similar to the example of FIG. 1A, but featuring an alternate embodiment of the one or more node devices 500 in which each node device 500 stores one of the data set portions 331 and performs the retrieval of data set subportions therefrom in lieu of the one or more storage devices 300 of FIG. 1A doing so. Thus, in FIG. 1B, such an alternate embodiment of the one or more node devices 500 may not receive a set of retrieved subportions 335 from one of the storage devices 300 of FIG. 1A via the network 999.

Figure 2A:
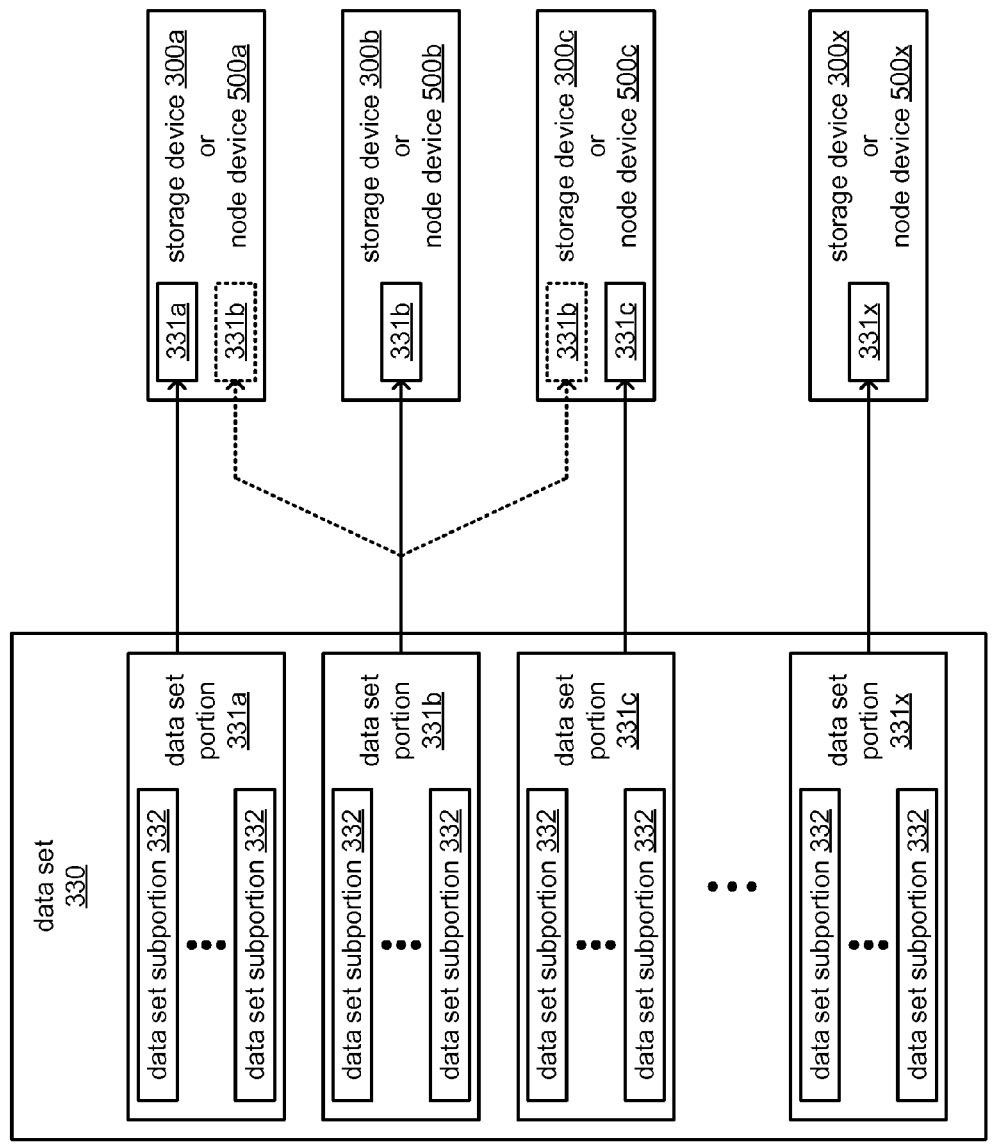

FIGS. 2A and 2B, together, illustrate an example of the distributed storage of a data set 330 among the storage devices 300 and/or the node devices 500 of the database system 1000. The data set 330 may be made up of a relatively large quantity of data items 333 that maybe arranged within the data set 330 in any of a variety of ways, including the earlier discussed example of a two-dimensional array of rows and columns. The data set 330 may be divided into the multiple data set portions 331.

Turning to FIG. 2A, as previously discussed, different ones of the data set portions 331 may be separately stored by different corresponding ones of the storage devices 300 or node devices 500. To facilitate discussion, the multiple depicted ones of the data set portions 331 have been designated as 331a-x, and corresponding ones of the multiple depicted ones of the storage devices 300 or node devices 500 in which different ones of the data set portions 331a-x are stored have been designated 300a-x or 500a-x, respectively. As familiar to those skilled in the art, such division and distributed storage of the data set 330 may be carried out for any of a variety of reasons, including and not limited to, redundancy of storage to prevent data loss in the event of a device failure. By way of example, and as depicted, a copy of the data set portion 331b stored by the storage device 300b or node device 500b may also be stored within the storage device 300a or node device 500a, and/or may also be stored within the storage device 300c or the node device 500c. In this way, the data set portion 331b is not lost if the storage device 300b or node device 500b suffers a failure.

Turning to FIG. 2B, each of the data set portions 331 may be made up of multiple ones of the data set subportions 332. As depicted, and as previously discussed as an example, the data set 330 may be organized into a two-dimensional array of rows and columns in which each of the data set subportions 332 is one of the rows. In this example, the division of the data set 330 into the multiple data set portions 331 may entail dividing the data set 330 into multiple sets of different ones of the rows, with each of those sets of rows becoming one of the data set portions 331. As a result, each of the data set portions 331 may have the same two-dimensional (row and column) organization as that of the whole data set 330. In such an example organization, the position occupied by a single data item 333 within one of the rows (e.g., one of the data set subportions 332) may be referred to by identifying the position within that row at which a column 334 that intersects that row in an indexing scheme that may employ row and column identifiers in a manner akin to two-dimensional coordinates.

As has been discussed, the performance of a database calculation may entail retrieving from each data set portion 331 a set of the data set subportions 332 that make up less than the entirety of each data set portion 331. Thus, as depicted in FIG. 2B for this example of two-dimensional (row and column) organization, the set of retrieved subportions 335 taken from the data set portion 331b may be less than all of the rows that make up the data set portions 331b.

It should be noted that, despite the specific depiction and discussion of an example of the data set 330 and of the data set portions 331 thereof as having a two-dimensional (row and column) organization, other embodiments are possible in which the data set 330 may employ an entirely different form of organization of the data items 333 therein. By way of example, an array of more than two dimensions may be employed (e.g., a hypercube), or an entirely different form of organization may be employed that is based on an entirely different data structure (e.g., a tree, a linked list, etc.).

Returning to FIG. 1A, in various embodiments, the coordinating device 100 incorporates one or more of a processor component 150, a storage 160, manually-operable controls 120, a display 180 and a network interface 190 to couple the coordinating device 100 to the network 999. The storage 160 may store one or more of a control routine 140, the task instructions 110 and the results data 730. The control routine 140 may incorporate a sequence of instructions operative on the processor component 150 to implement logic to perform various functions.

In executing the control routine 140, the processor component 150 of the coordinating device 100 may operate the display 180 and the controls 120 thereof to provide a user interface to an operator of the coordinating device 100 to enable the operator to provide at least a portion of the task instructions 110 setting forth a new database calculation. In some embodiments, such a user interface may include a text editor that enables the operator to directly enter at least a portion of the task instructions 110. In other embodiments, such a user interface may guide the operator in a step-by-step manner with various prompts through the entry of pieces of information from which the processor component 150 may generate at least a portion of the task instructions 110. Following generation of the task instructions 110, the processor component 150 may operate the network interface 190 to transmit the task instructions 110 via the network 999 to one or more of the node devices 500.

In various embodiments, each of the node devices 500 incorporates one or more of a processor component 550, a storage 560 and a network interface 590 to couple the node device 500 to the network 999. The storage 560 may store one or more of the task instructions 110, one or more of the sets of retrieved subportions 335, one or more sets of organized subportions 531, one or more sets of processed subportions 532, progress data 533, an execution routine 540 and the results data 730. In embodiments in which the one or more node devices 500 also directly store the data set portions 331 and directly retrieve the sets of retrieved subportions 335 therefrom, the storage 560 of each of the one or more node devices 500 may also store at least one of the data set portions 331. The task instructions 110 and the execution routine 540 may each incorporate a sequence of instructions operative on the processor component 550 of a single node device 500 or of multiple ones of the node devices 500 to implement logic to perform various functions.

In executing the execution routine 540, the processor component 550 of at least one of the node devices 500 may perform various portions of the task instructions 110 under the control of the execution routine 540. In so doing, the processor component 550 may organize the data set subportions 332 making up one or more of the sets of retrieved subportions 335 in a manner specified within the task instructions 110, may perform at least a part of the database calculation set forth in the task instructions 110, and/or may generate the results data 730. The processor component 550 may then transmit the results data 730 to one or both of the coordinating device 100 and the viewing device 700.

In embodiments in which the one or more storage devices 300 are present within the database system 1000 to store the data set portions 331 of the data set 330, the processor component 550 may transmit a request to one or more of the storage devices 300 for particular data set subportions 332 indicated in the task instructions 110 via the network 999. The processor component may then receive those particular data set subportions 332 therefrom via the network 999 in the form of at least one of the sets of retrieved subportions 335. Alternatively, in embodiments in which the one or more storage devices 300 are not present within the database system 1000, and one or more node devices 500 store the data set portions 331 of the data set 330, the processor component may perform the search of the at least one of the data set portions 331 for those particular data set subportions 332, and may itself generate and store those particular data set subportions within the storage 560 as one or more of the sets of retrieved subportions 335.

In further executing the execution routine 540, the processor component 550 may monitor the availability of various resources provided within its corresponding one of the node devices 500 throughout the performance of the portions of the task instructions 110. More specifically, the processor component 550 may monitor the availability of processing resources of the processor component 550 itself, the availability of memory space within the storage 560, the availability of communications bandwidth through the network interface 590, and/or other resources of the at least one node device 500. As will be explained in greater detail, as instances arise of the limit of availability of a resource is near to being reached (e.g., the amount of a resource that remains available falls below a threshold), the organization of retrieved ones of the data set subportions 332 and/or the performance of the database calculation on organized ones of the data set subportions 332 may be controlled to bring about increased availability of that resource.

In various embodiments, each of the storage devices 300 (if present in the database system 1000) incorporates one or more of a processor component 350, a storage 360 and a network interface 390 to couple the storage device 300 to the network 999. The storage 360 may store at least one data set portion 331 of the data set 330, at least one of the sets of retrieved subportions 335, and a database routine 340. The database routine 340 may incorporate a sequence of instructions operative on the processor component 350 of a single storage device 300 or multiple ones of the storage devices 300 to implement logic to perform various functions.

In executing the database routine 340, the processor component 350 of at least one of the storage devices 300 may receive a request from at least one of the node devices 500 for particular data set subportions 332, and may search through the one or more data set portions 331 that are stored within its corresponding one of the storage devices 300 for those particular data set subportions 332. Upon retrieving one or more of those particular data set subportions 332, the processor component 350 may then transmit the retrieved ones of those particular data set subportions 332 as one or more of the sets of retrieved subportions 335 to the requesting one(s) of node devices 500.

In various embodiments, the viewing device 700 incorporates one or more of a processor component 750, a storage 760, manually-operable controls 720, a display 780 and a network interface 790 to couple the viewing device 700 to the network 999. The storage 760 may store one or more of a viewing routine 740 and the results data 730. The viewing routine 740 may incorporate a sequence of instructions operative on the processor component 750 to implement logic to perform various functions.

In executing the viewing routine 740, the processor component 750 of the viewing device 700 may operate the network interface 790 to await receipt of the results data 730 from one of the node devices 500. Upon receipt of the results data 730, the processor component 750 may be caused to generate a visual representation of the results indicated in the results data 730, and may present that visual representation on the display 780.

Correspondingly, the processor component of the coordinating device 100 may be caused by execution of the control routine 140 to also operate the network interface 190 to await receipt of the results data 730 from one of the node devices 500. Upon receipt of the results data 730, the processor component 150 may similarly generate a visual representation of the results indicated in the results data 730, and may present that visual representation on the display 180. Alternatively or additionally, the processor component 150 may employ the results data 730 as an input to further database processing operations.

Figure 3:
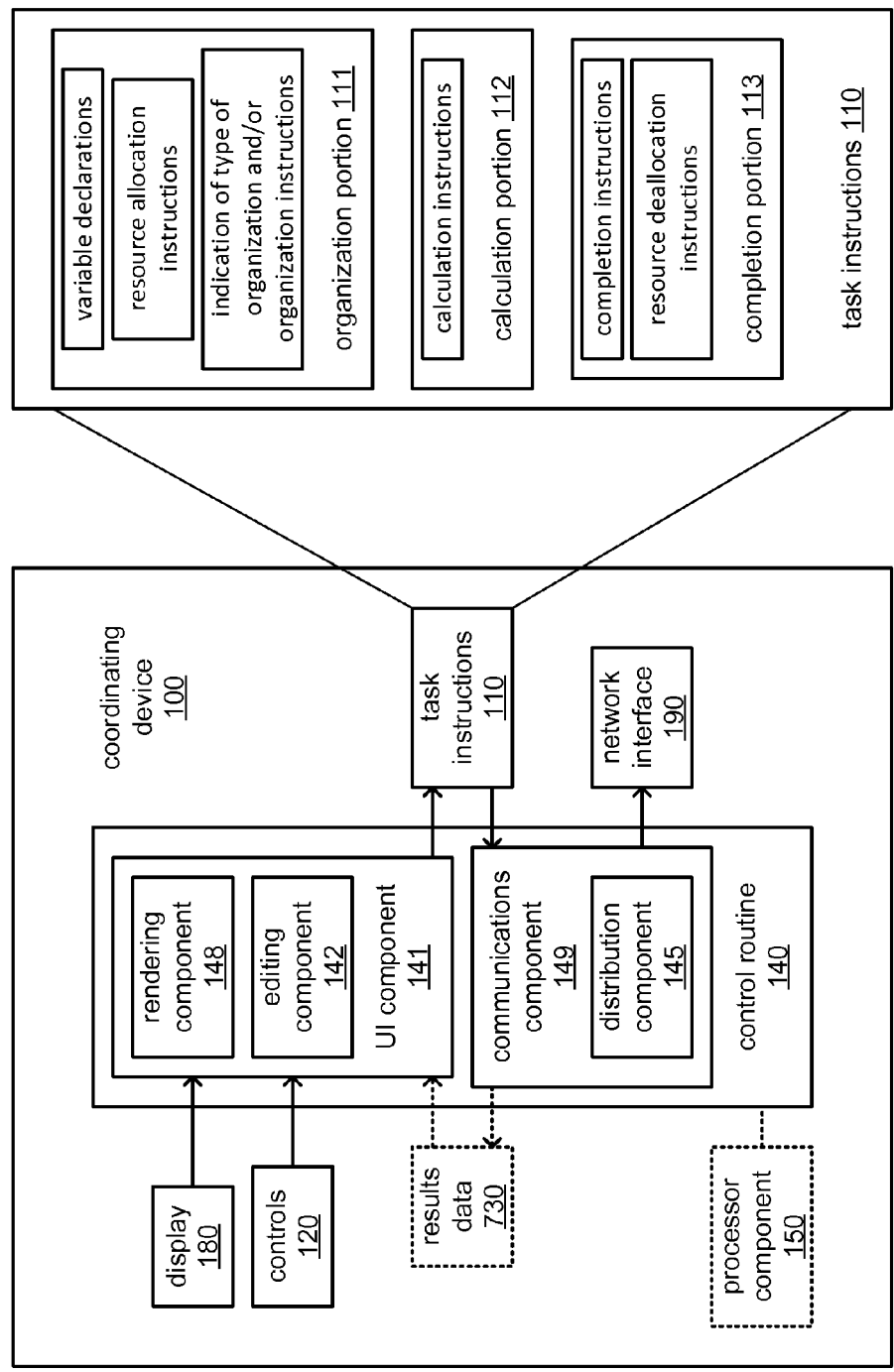
FIG. 3 illustrates an example of an operating environment for a portion of a database system.

FIG. 3 illustrates a block diagram of an example embodiment of a portion of the database system 1000. More specifically, FIG. 3 depicts aspects of the operating environment of an embodiment of the coordinating device 100 in which the processor component 150, in executing the control routine 140, may receive the task instructions 110. Additionally, the processor component 150 may be caused to distribute the task instructions 110 among the one or more node devices 500 from the coordinating device 100.

The control routine 140 and the components of which it is composed may be selected to be operative on whatever type of processor or processors that are selected to implement the processor component 150. In various embodiments, the control routine 140 may include one or more of an operating system, device drivers and/or application-level routines (e.g., so-called "software suites" provided on disc media, "applets"

obtained from a remote server, etc.). Where an operating system is included, the operating system may be any of a variety of available operating systems appropriate for the processor component 150. Where one or more device drivers are included, those device drivers may provide support for any of a variety of other components, whether hardware or software components, of the coordinating device 100.

The control routine 140 may include a user interface (UI) component 141 for execution by the processor component 150 to operate the controls 120 and/or the display 180 to provide a user interface to an operator of the coordinating device 100. As previously discussed, such provision of a user interface may enable the operator to provide at least a portion of the task instructions 110. As depicted, the UI component 141 may include an editing component 142 to provide a text editing environment or other UI environment in which the operator may operate the controls 120 to enter at least a portion of the task instructions 110, thereby directly providing instructions to perform a new database calculation to the coordinating device 100. Alternatively or additionally, and as also depicted, the UI component 141 may include a rendering component 148 to generate and/or operate the display 180 to visually present one or more visual prompts requesting pieces of information for a new database calculation, and may use the responses provided by the operator (e.g., via the controls 120) to generate at least a portion of the task instructions 110 to include the instructions to perform the new database calculation. As still another alternative, an operator of the coordinating device 100 may provide the task instructions 110 to the coordinating device 100 in any of a variety of other ways, including and not limited to, via removable media (e.g., a removable solid state storage device, not shown), or via a wired or wireless link between the coordinating device 100 and another device (not shown).

Regardless of the manner in which the task instructions 110 are received by and/or are generated within the coordinating device 100, in some embodiments, the task instructions 110 may be made up of distinct portions, such as the depicted preparation portion 111, calculation portion 112 and completion portion 113. In some embodiments, the preparation portion 111 may include relatively simple indications of the type of organization to be performed on the retrieved ones of the data set subportions 332 that make up each of the sets of retrieved subportions 335 prior to performance of the database calculation. By way of example, such relatively simple indications could be bit values of a byte indicating a selection of ordering or grouping, a selection between an alphabetical order or a numerical order, and/or a selection of ascending or descending order. In other embodiments, the preparation portion 111 may include executable instructions for performing such organization. The calculation portion 112 may be made up primarily of instructions for performing the database calculation. The completion portion 113 may include instructions for performing various post-calculation functions. In various embodiments, either or both of the calculation portion 112 and the completion portion 113 may include instructions for performing at least part of aggregating results of the database calculation to generate the results data 730.

Instructions within the preparation portion 111, the calculation portion 112 and/or the completion portion 113 may be written in any of a variety of programming languages, including and not limited to, one or more programming languages of SAS Institute Inc., of Cary, N.C., such as the SAS DS2 language. By way of example, instructions within the preparation portion 111, calculation portion 112 and/or the completion portion 113 may be written in the SAS DS2 language as an "Init" procedure, a "Run" procedure and/or a "Term" procedure, respectively, that are each able to be called at appropriate times by the processor component 550 of one or more of the node devices 500 for execution thereby. In such an example, the preparation portion 111 may include various instructions to allocate resources of a node device 500 and/or to declare various variables, the completion portion 113 may include various instructions to deallocate those resources.

The control routine 140 may include a communications component 149 executable by the processor component 150 to operate the network interface 190 to exchange communications via the network 999 as has been described. Among the communications may be those conveying the task instructions 110 and/or the results data 730 among the devices 100, 300, 500 and/or 700 via the network 999. The communications components 149 may be selected to be operable with whatever type of interface technology is selected to implement the network interface 190.

The communications component 149 may include a distribution component 145 to control the distribution of the task instructions 110 among the node devices 500. More specifically, the communications component 149 may recurringly receive status information from each of multiple ones of the node devices 500, and may use such information to select at least a subset of those node devices 500 to distribute the task instructions 110 to based on indications of which ones of the node devices 500 have sufficient available resources to perform at least part of a database calculation. Alternatively or additionally, the distribution component 145 may select ones of the node devices 500 to which to distribute the task instructions 110 that collectively have access to all of the data set portions 331 from which all of the sets of retrieved subportions 335 that are needed to perform the database calculation are able to be retrieved.

FIG. 4 depicts aspects of an example of distribution of the task instructions 110 by the distribution component 145. As previously discussed, either the storage devices 300 or the node devices 500 may store the data set portions 331 that make up the data set 330. As also discussed, performing a database calculation may entail retrieving a subset of the data set subportions 332 that make up each of those data set portions 331 to use as inputs to the database calculation (e.g., the sets of retrieved subportions 335). Thus, the distribution component 145 may select ones of the node devices 500 that store the ones of the data set portions 331 from which the sets of retrieved subportions 335 may be so retrieved in embodiments in which it is one or more of the node devices 500 that store the data set portions 331. Alternatively, the distribution component 145 may select ones of the node devices 500 that are able to receive the sets of retrieved subportions 335 from the ones of the storage devices 300 that store those data set portions 331. By way of example, and as depicted in FIG. 3B, the depicted node devices 500*a-x* may be able to receive corresponding ones of the sets of retrieved subportions 335*a-x* from corresponding ones of the storage devices 300*a-x* that store corresponding ones of the data set portions 331*a-x*. The distribution component 145 may, therefore, select these particular node devices 500*a-x* to distribute the task instructions 110 to as a result of the access that each has to at least one of the sets of retrieved subportions 335*a-x*.

Figure 5A:
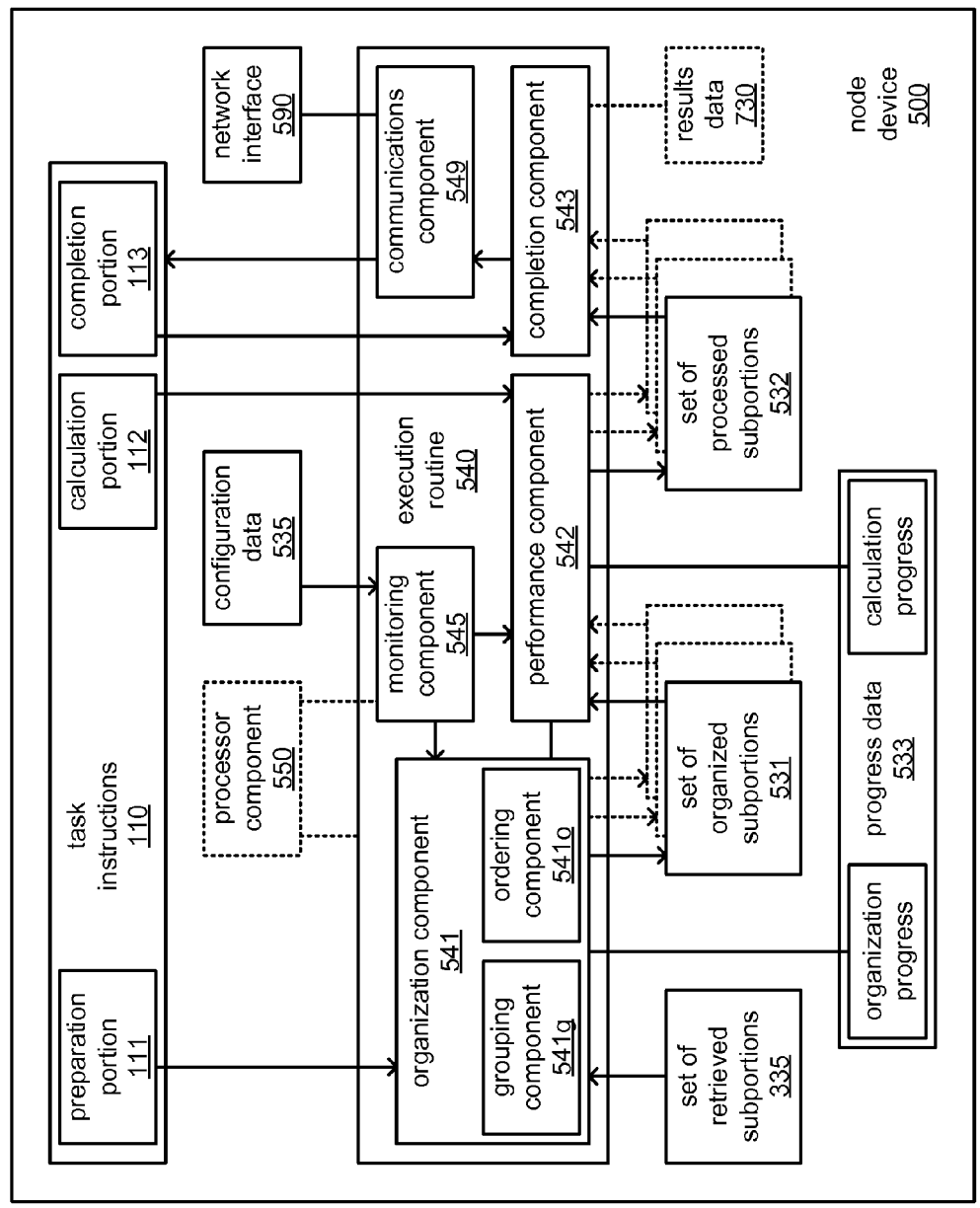
FIGS. 5A and 5B, together, illustrate an example of an operating environment for another portion of a database system.
Figure 5B:
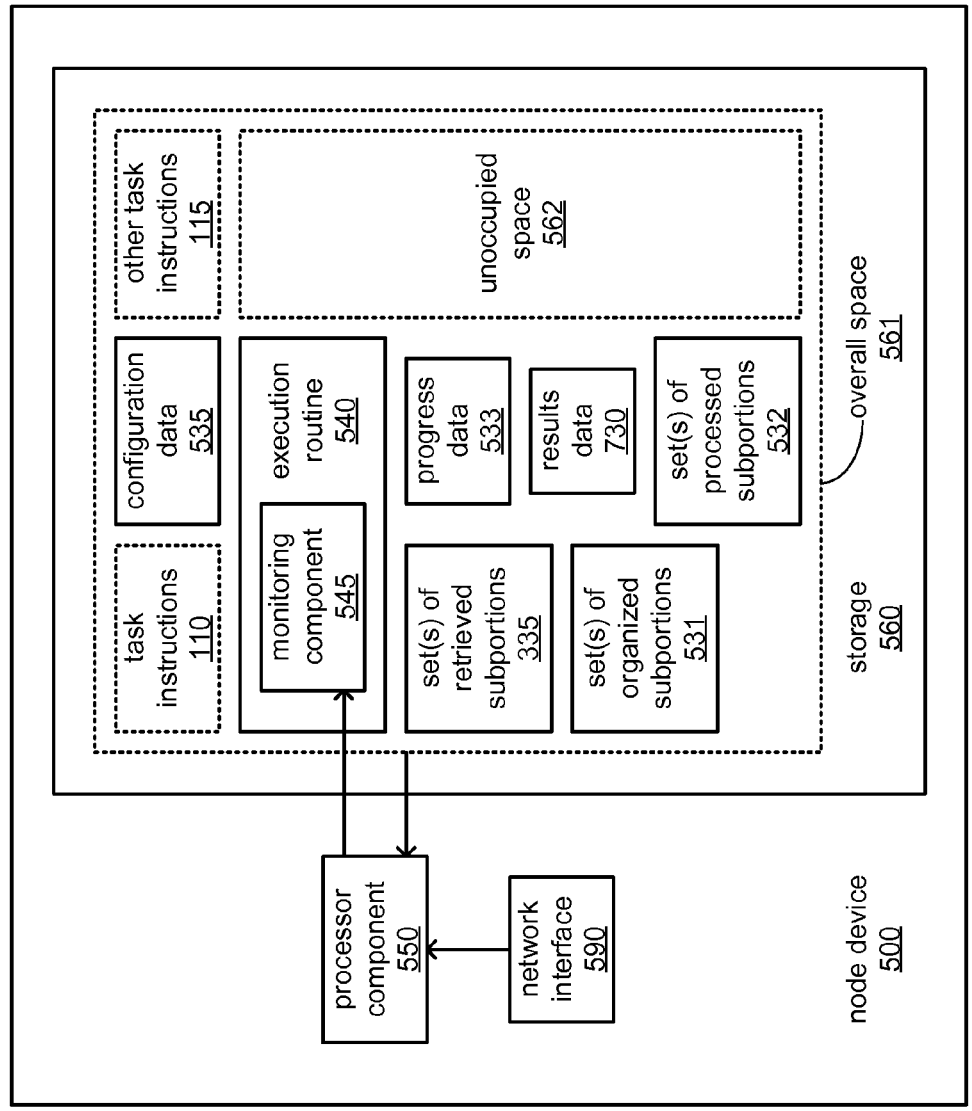

FIGS. 5A and 5B, together, illustrate block diagrams of an example embodiment of another portion of the database system 1000. More specifically, FIG. 5A depicts aspects of the operating environment of at least one of the node devices 500 in which the processor component 550, in executing the execution routine 540, may control the performance of the task instructions 110 in response to varying levels of resource availability. FIG. 5B depicts aspects of the operating environment of at least one of the node devices 500 in which the processor component 550, in executing the execution routine 540, may monitor the availability of various resources.

The execution routine 540 and the components of which it is composed may be selected to be operative on whatever type of processor or processors that are selected to implement the processor component 550. In various embodiments, the execution routine 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 550. Where one or more device drivers are included, those device drivers may provide support for any of a variety of other components, whether hardware or software components, of at least one of the node devices 500.

Turning to FIG. 5A, the execution routine 540 may include a communications component 549 executable by the processor component 550 to operate the network interface 590 to exchange communications via the network 999 as has been described. Among the communications may be those conveying the task instructions 110 and/or the results data 730 among the devices 100, 300, 500 and/or 700 via the network 999. The communications components 549 may be selected to be operable with whatever type of interface technology is selected to implement the network interface 590.

The execution routine 540 may include an organization component 541 for execution by the processor component 550 to control and/or perform the organizing of at least one of the sets of retrieved subportions 335. As previously discussed, a set of retrieved subportions 335 may be provided by one of the storage devices 300 from a data set portion 331 stored by that one of the storage devices 300, or may be generated by the processor component 550 from directly retrieving particular data set subportions 332 specified by the task instructions 110 from a data set portion 331 stored by the node device 500. Regardless of the exact manner in which the set of retrieved subportions 335 is so retrieved, the data set subportions 332 that make up the set of retrieved subportions 335 may need to be organized in a manner specified by the task instructions 110 before they can be employed as inputs to a database calculation. As part of performing and/or controlling the performance of such organization, the organization component 541 may store one or more the now organized ones of the data set subportions 332 as one or more of the sets of organized subportions 531 to enable their use as inputs to performance(s) of the database calculation.

The organization component 541 may retrieve from the preparation portion 111 of the task instructions 110 an indication of the type of organization required. Again, in some embodiments, the preparation portion 111 may include one or more relatively simple indications of the type of organization required (e.g., Boolean values indicating a selection between ordering and grouping, a selection between a numerical or an alphabetical order, and/or a selection between ascending or descending order). In such embodiments, the organization component 541 may perform the type of organization of the data set subportions making up the set of retrieved subportions 335 that is specified in the preparation portion 111. However, in other embodiments, the preparation portion 111 may include instructions that may be operative on the processor component 550 to perform the specified type of organization. In such other embodiments, the organization component 541 may control the execution of those instructions by the processor component 550.

As previously discussed, among the types of organization of the set of retrieved subportions 335 that may be specified may be ordering or grouping based on the data values of a particular data item 333 within each of the data set subportions 332 that make up the set of retrieved subportions 335. The particular data item on which either ordering or grouping is to be based may be specified within the preparation portion 111 along with the indication of the type of organization.

Figure 6A:
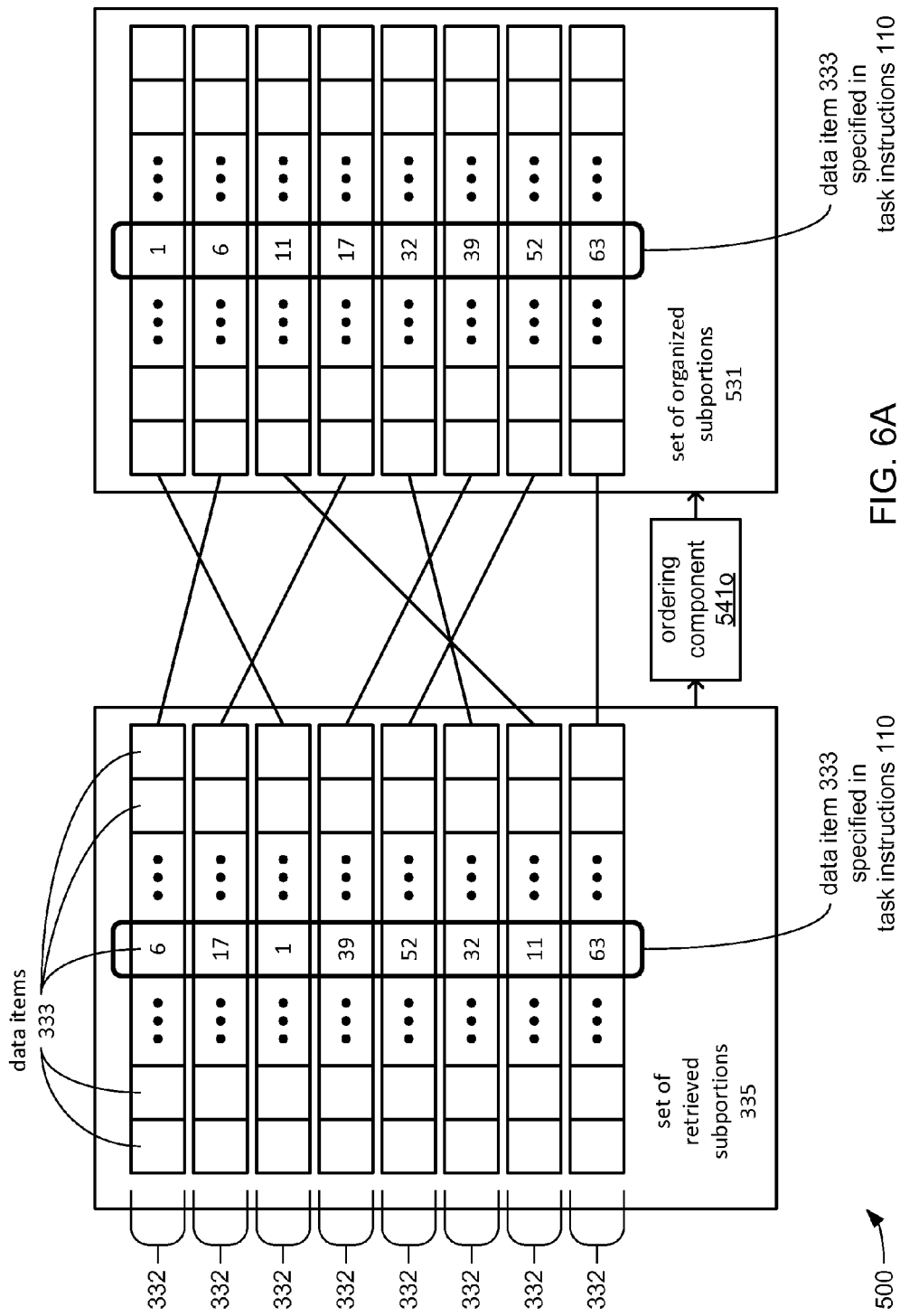
FIGS. 6A, 6B and 6C each illustrate an example embodiment of organizing data set subportions retrieved from a data set portion.

As depicted, the organization component 541 may include an ordering component 541o to perform ordering based on the data values of a data item 333 specified within the preparation portion 111 or to control the performance of such ordering performed by the processor component 550 in executing instructions of the preparation portion 111. Where the type of organization is specified in the preparation portion 111 as ordering, the ordering component 541o may organize the data set subportions 332 that make up the set of retrieved subportions 335 into an ascending or descending order based on data values for the specified data item 333. FIG. 6A depicts a simplified example of the ordering component 541o ordering a set of retrieved subportions 335 made up of a relatively small quantity of eight data set subportions 332. As depicted with a bold rounded box, the preparation portion 111 specifies that the data values of a particular data item 333 that is present in all eight of the data set subportions 332 are to be used in a numerical ordering, and as also depicted, the resulting numerical order is specified to be an ascending numerical order. Again, in an example embodiment in which the data items 333 of the data set 330 are arranged in a two-dimensional array in which each data set subportion 332 corresponds to a row, the particular data item 333 on which such ordering is based may be specified by specifying the column that intersects each of those rows at the position occupied by data value of the particular data item 333.

Figure 6B:
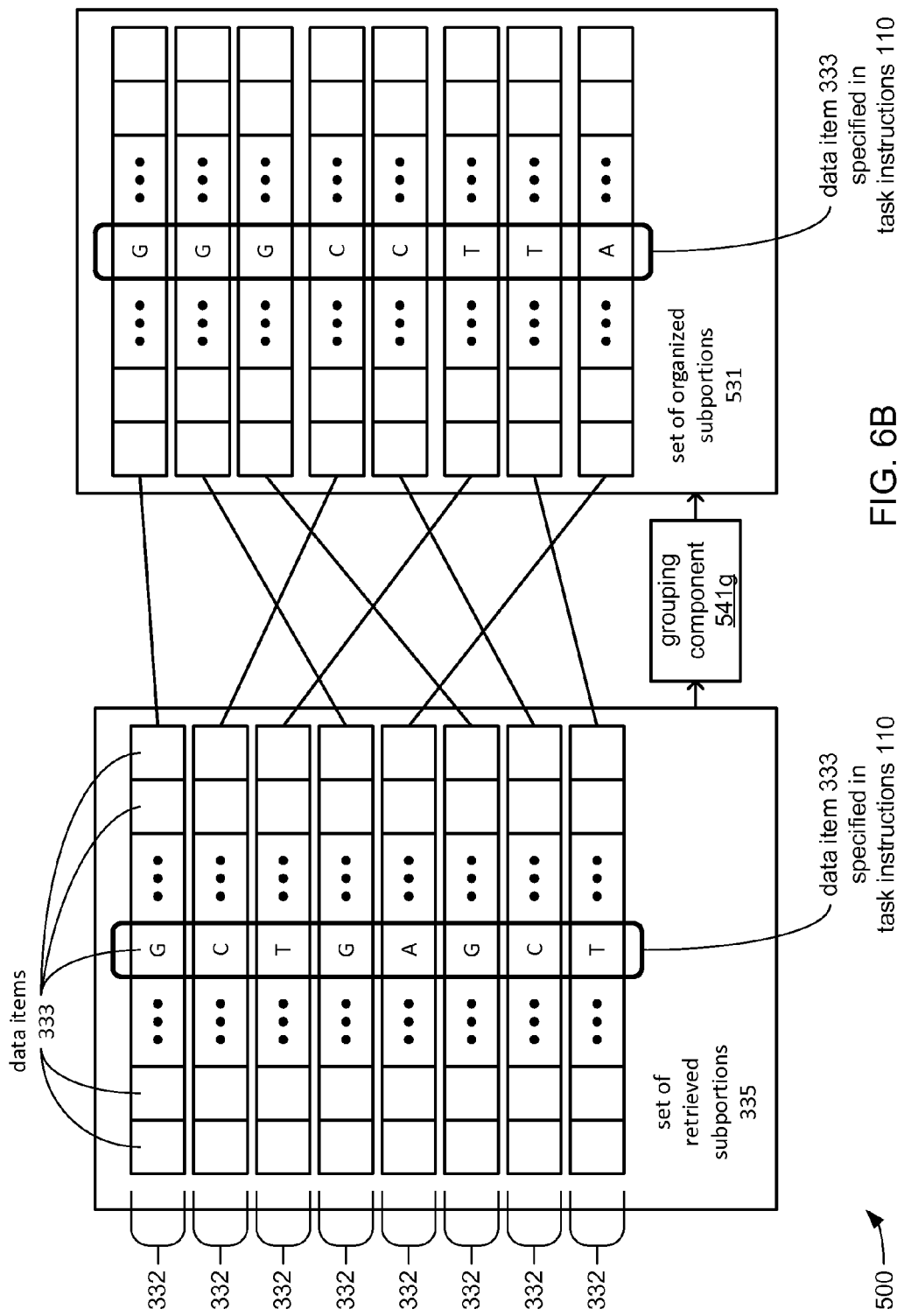

Returning to FIG. 5A, as also depicted, the organization component 541 may include a grouping component 541g to perform grouping based on the data values of a data item 333 specified within the preparation portion 111 or to control the performance of grouping performed by the processor component 550 in executing instructions of the preparation portion 111. Where the type of organization specified is specified in the preparation portion 111 as grouping, the grouping component 541g may organize the data set subportions 332 that make up a set of retrieved subportions 335 into groups based on matching data values for a data item 333 specified within the preparation portion 111. FIG. 6B depicts a simplified example of the grouping component 541g grouping a set of retrieved subportions 335 made up of a relatively small quantity of eight data set subportions 332. As depicted with a bold rounded box, the preparation portion 111 specifies that the data values of a particular data item 333 that is present in all eight of the data set subportions 332 are to be used in grouping based on matching data values that denote characters of an alphabet (in this case, the four text characters commonly used to denote the four known nucleotides of a genetic sequence). As depicted, the resulting grouping need not be alphabetically ordered, although such ordering of the resulting groups of data set subportions 332 may, in some embodiments, be achieved through cooperative use of both of the ordering component 541o and the grouping component 541g.

Figure 6C:
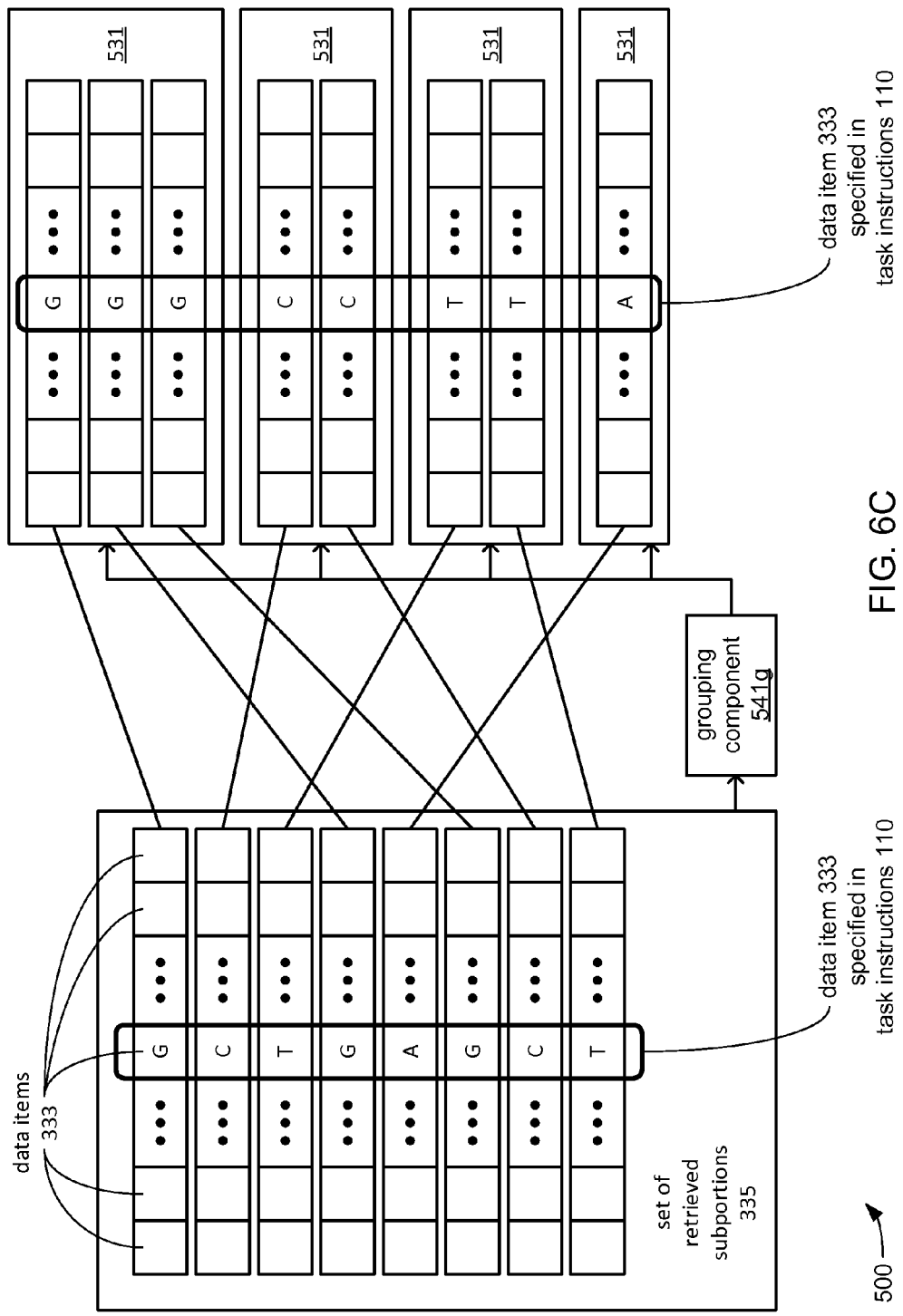

FIG. 6C depicts an alternate simplified example of the grouping component 541g grouping the same set of retrieved subportions 335 as depicted in FIG. 6B. However, while the result in FIG. 6B was the generation of a single set of organized subportions 531 in which all eight of the data sets subportions 332 of the set of retrieved subportions 335 were grouped, the result in FIG. 6C is the generation of a separate set of organized subportions 531 for each data value of the specified data item 333 around which one or more of the data set subportions 332 are grouped. Again as depicted, the resulting grouping need not be alphabetically ordered.

In some embodiments, the organizing of the data set subportions 332 of the set of retrieved subportions 335 may be specified in the preparation portion 111 as being conditional. More specifically, either with another relatively simple indicator or with executable instructions, the preparation portion 111 may specify that such organizing of data set subportions 332 may be conditional upon detecting that the data set subportions 332 of the set of retrieved subportions 335 are not already organized as specified in the preparation portion 111. In response to an indication that such organizing is conditional, the ordering component 541o or the grouping component 541g may initially compare the data values of the specified data item of each data set subportion 332 to each other as the data set subportions 332 are relayed for processing to verify that the data set subportions 332 are already organized as specified in the preparation portion 111. If so, then the entirety of the set of retrieved subportions 335 may be relayed by the organization component 541 for processing as inputs to a performance of the database calculation without having been organized by the organization component 541. However, if not, then the organization component 541 may organize at least a subset of the data set subportions 332 into the type of organization specified in the preparation portion 111.

Returning to FIG. 5A and regardless of the type of organization of data set subportions 332 that is performed, the organization component 541 may store ones of the data set subportions 332 from the set of retrieved subportions 335 that have been organized as at least one of the sets of organized subportions 531. The data set subportions 332 may be organized within each of the sets of organized subportions 531 into any of a variety of types of data structures, including and not limited to, an array, a linked list, or a ring buffer. The type of data structure that is selected and/or the manner in which the data set subportions 332 therein are accessed may be to ensure that the ordering, grouping or other type of organization into which those data set subportions 332 have been organized is preserved as those data set subportions 332 are processed as inputs to the database calculation. Stated differently, the manner in which data set subportions 332 are stored within and retrieved from each of the sets of organized subportions 531 may be configured to operate in a manner akin to a first-in-first-out (FIFO) buffer.

The execution routine 540 may include a performance component 542 for execution by the processor component 550 to control the performance of at least a part of the database calculation by the processor component 550 in executing instructions of the task instructions 110 to do so. The performance component 542 may retrieve, from the calculation portion 112 of the task instructions 110, instructions that may be operative on the processor component 550 to cause the processor component 550 to perform at least part of the database calculation. As previously discussed, the performance of the database calculation may be distributed among multiple ones of the node devices 500 such that the processor components 550 of the multiple node devices 500 may each perform a part of the database calculation at least partially in parallel with each other. Each such part of the database calculation performed within one of the node devices 500 may use as input(s) one or more of the sets of organized subportions 531 generated by the organization component 541.

The database calculation set forth by the instructions of the calculation portion 112 may be any of a variety of types of database calculation. Among the types of database calculation that may be performed may be a relatively simple database calculation such as, and not limited to, determining the sum, average, minimum value or maximum value of one or more data items within each of the retrieved data set subportions. Alternatively or additionally, the type of database calculation that may be performed may be a relatively complex database calculation such as, and not limited to, deriving a statistical copula and/or determining one or more probabilities based on one or more data items within each of the retrieved data set subportions.

In controlling the execution of the instructions of the calculation portion 112 by the processor component 550, the performance component 542 may retrieve from the storage 560 the one or more sets of organized subportions 531 generated by the organization component 541. As the database calculation is performed such that data set subportions 332 of the one or more sets of organized subportions 531 are processed, the now processed ones of those data set subportions 332 may be stored by the performance component 542 in the storage 560 as one or more of the processed subportions 532 for subsequent aggregation to derive the results data 730.

The execution routine 540 may include a completion component 543 for execution by the processor component 550 to control aggregation of results and/or generation of the results data 730. The completion component 543 may retrieve, from the completion portion 113 of the task instructions 110, instructions that may be operative on the processor component 550 to cause the processor component 550 to perform, in cooperation with one or more others of the node devices 500, at least part of the aggregation of results of multiple performances of the database calculation and/or the generation of the results data 730. As previously discussed, the performance of the database calculation may be distributed among multiple ones of the node devices 500 such that the processor components 550 of the multiple node devices 500 may each perform a part of the database calculation at least partially in parallel with each other. Each such part of the database calculation performed within one of the node devices 500 may result in the generation and storage one or more of the sets of processed subportions 532 therein.

In some embodiments, the completion component 543 and communications component 549 of the execution routines 540 within each of multiple ones of the node devices 500 may exchange sets of processed subportions 532 and/or indications of results derived from sets of processed subportions 532 thereamong to aggregate the results of the distributed performance of the database calculation. In so doing, a single one of the node devices 500 may serve as a final point of concentration among multiple node devices 500 at which at least a final aggregation of results occurs to generate the results data 730 under the control of the completion component 543 of the execution routine 540 thereof. Following such final aggregation of results and generation of the results data 730, the completion component 543 of the node device 500 in which the results data 730 is generated may cooperate with the communications component 549 to transmit the results data 730 to one or both of the coordinating device 100 and the viewing device 700.

In the interests of performing the database calculation as efficiently as possible among multiple ones of the node devices 500, it may be deemed desirable, within each such node device 500, for all organization of the data set subportions 332 of set(s) of retrieved subportions 335 to be completed before the processing of any of those data set subportions 332 as inputs in a performance of part of the database calculation. It may also be deemed desirable for all of the data set subportions 332 so provided as inputs in the form of one or more of the sets of organized subportions 531 to be fully processed through the database calculation before any aggregation of the results thereof as part of generating the results data 730.

Thus, where the type of organization specified within the preparation portion 111 of the task instructions 110 is ordering, it may be deemed desirable for the processor component 550 of a node device 500 to generate a single one of the sets of organized subportions 531 from a single one of the sets of retrieved subportions 335, as depicted in the relatively simplified example of FIG. 6A. Correspondingly, where the specified type of organization is grouping, it may be deemed desirable for the processor component 550 of a node device 500 to generate a single one of the sets of organized subportions 531 from a single one of the sets of retrieved subportions 335, as depicted in the relatively simplified example of FIG. 6B. Alternatively, where the specified type of organization is grouping, it may be deemed desirable for a single one of the sets of organized subportions 531 to be generated for each data value of the specified data item 333 for which a group of data set subportions 332 is formed, as depicted in the relatively simplified example of FIG. 6C.

However, and returning to FIG. 5A, as has been discussed, one or more limitations in various resources available within one or more of the node devices 500 may be encountered during either organization or processing of data set subportions 332. Such limitations may include, and are not limited to, limitations in processing resources able to be provided by the processor component 550, limitations in available memory space within the storage 560, and/or limitations in available network interface bandwidth of the network interface 590.

The execution routine 540 may include a monitoring component 545 for execution by the processor component 550 to monitor the status of one or more of such resources during such organization of the set of retrieved subportions 335 and/or during such processing of one or more sets of the organized subportions 531. FIG. 5B depicts aspects of such monitoring. As depicted, the monitoring component 545 may recurringly receive indications of the current status of the processor component 550, including indications of the level of processing resources of the processor component 550 that are currently available. Alternatively or additionally, through the processor component 550, the monitoring component 545 may recurringly receive indications of what portion of the overall space 561 of the storage 560 is currently unoccupied space 562, vs. what portion is currently occupied by executable instructions such as one or more of the task instructions 110, other instructions 115 and/or the execution routine 540, as well as what portion is currently occupied by the set of retrieved subportions 335, one or more sets of organized subportions 531, one or more sets of processed subportions 532 and/or the results data 730. Also alternatively or additionally, through the processor component 550, the monitoring component 545 may recurringly receive indications of the level of network bandwidth still available for use through the network interface 590.

The monitoring component 545 may recurringly compare such levels of available resources to one or more thresholds to determine whether the level of any of those resources has fallen below a threshold such that current usage of one or more of such resources is approaching a limit of availability. As familiar to those skilled in the art, one or more of such thresholds may be selected to ensure that enough of one or more of such resources remains available for corrective action to be taken even as a level of availability of one or more resources falls below one of the thresholds. Returning to FIG. 5A, upon determining that a level of availability of at least one resource has fallen below a threshold, the monitoring component 545 may provide an indication to one or both of the organization component 541 and the performance component 542 of which resource is affected and/or that corrective action needs to be taken to increase the availability of that affected resource. In various embodiments, the monitoring component 545 may select one or the other of the organization component 541 and the performance component 542 to provide such an indication to. Such a selection may be based on which of the components 541 or 542 uses more of the affected resource and/or which of the components 541 or 542 is currently performing its function.

Where the organization component 541 receives an indication from the monitoring component 545 of an instance of a level of availability of a particular resource falling below a threshold during organization of data set subportions 332 of the set of retrieved subportions 335, the organization component 541 may take corrective action to increase the availability of the particular resource by interrupting such organization of data set subportions 332. Alternatively or additionally, the organization component 541 may dispatch ones of the data set subportions 332 from the set of retrieved subportions 335 that have been organized so far as one of the sets of organized subportions 531 for processing as inputs to a performance of the database calculation by the performance component 542. Such an interruption in the organizing of data set subportions 332 and/or such dispatching of data set subportions 332 that have been organized may enable an increase in the level availability of the particular resource. By way of example, the interruption of execution of instructions to organize data set subportions 232 may make more processing resources of the processor component 550 available. Also by way of example, such dispatching of organized ones of the data set subportions 332 may enable memory space within the storage 560 that was allocated to storing those data set subportions 332 for being organized to become available.

In some embodiments, the organization component 541 and the performance component 542 may exchange status indications and/or other indications to coordinate the performances of their respective functions. Such indications may be exchanged through the storage within and retrieval from the progress data 533 of indications of progress in organizing data set subportions 332 by the organization component 541 and/or indications of progress in processing data set subportions 332 as inputs to performance(s) of the database calculation by the performance component 542. Thus, the performance component 542 may receive an indication through the progress data 533 and/or by another mechanism from the organization component 541 that a set of organized subportions 531 has been dispatched. In response, the performance component 542 may process the data set subportions 332 thereof as inputs to a performance of the database calculation.

In some embodiments, the organization component 541 and the performance component 542 may not perform their respective functions simultaneously such that the instructions of only one or the other may be executed by the processor component 550 at a time. Thus, after interrupting the organizing of data set subportions 332 and dispatching the ones that have been sorted so far as a set of organized subportions 531 to the performance component 542 for processing, the organizing component 541 may await both an indication from the performance component 542 that all of the data set subportions 332 within that set of organized subportions 531 have been processed and an indication from the monitoring component 545 that the particular resource once again has a level of availability that is above a corresponding threshold before resuming the organizing of data set subportions 332. However, in other embodiments, the organization component 541 and the performance component 542 may be permitted to perform their respective functions simultaneously such that the processor component 550 may execute the instructions of both at least partially simultaneously. Thus, after interrupting the organizing of data set subportions 332 and dispatching the ones that have been sorted so far as a set of organized subportions 531 to the performance component 542 for processing, the organizing component 541 may await only an indication from the monitoring component 545 that the particular resource once again has a level of availability that is above a corresponding threshold before resuming the organizing of data set subportions 332.

Where the performance component 542 receives an indication from the monitoring component 545 of an instance of a level of availability of a particular resource falling below a threshold during processing of data set subportions 332 of a set of organized subportions 531 as inputs to a performance of the database calculation, the performance component 542 may take corrective action to increase the availability of the particular resource by interrupting such processing of data set subportions 232. Alternatively or additionally, the performance component 542 may dispatch ones of the data set subportions 332 in a set of organized subportions 531 that have been processed so far as one of the sets of processed subportions 532 for aggregation of results by the completion component 543. Such an interruption in the processing of data set subportions 332 and/or such dispatching of data set subportions 332 as a set of processed subportions 532 may enable an increase in the level availability of the particular resource. By way of example, the interruption of execution of instructions to process data set subportions 232 may make more processing resources of the processor component 550 available. Also by way of example, where such processing entailed retrieval of still other pieces of information from one or more other devices through use of the network interface 590, the interruption of such processing may make more network bandwidth through the network interface 590 available. By way of still another example, such dispatching of processed ones of the data set subportions 332 may enable memory space within the storage 560 that was allocated to storing those data set subportions 332 for being processed to become available.

Upon resuming the organizing of data set subportions 332 of the set of retrieved subportions 335 following an interruption and dispatching of a set of organized subportions 531, the organization component 541 must generate and dispatch at least one additional set of organized subportions 531. Also, another instance of the level of availability of a resource falling below a threshold may occur, which may result in the dispatching of multiple additional sets of organized subportions 531 as a result of another interruption coupled with the dispatching of another set of organized subportions 531 before all of the data set subportions 332 of the set of retrieved subportions 335 have been organized. Correspondingly, Upon resuming the processing of data set subportions 332 of one or more sets of organized subportions 531 following an interruption and dispatching of a set of processed subportions 532 for aggregation, the performance component 542 must generate and dispatch at least one additional set of processed subportions 532. Also, another instance of the level of availability of a resource falling below a threshold may occur, which may result in the dispatching of multiple additional sets of processed subportions 532 as a result of another interruption coupled with the dispatching of another set of processed subportions 532 before all of the data set subportions 332 of one or more sets of organized subportions 531 have been processed.

Thus, earlier described desired limiting of quantities of sets of organized subportions 531 and/or processed subportions 532 derived from a single set of retrieved subportions 335 to increase efficiency may be thwarted by the corrective actions taken by organization component 541 and/or performance component 542 in response to instances of approaching limits in the availability of one or more resources. To minimize such effects, the organization component 541 and the performance component 542 may cooperate to determine whether a next set of organized subportions 531 to be dispatched for processing is able to be treated as a continuation of the last set of organized subportions 531 to be dispatched for processing. Stated differently, where the organization component 541 has generated and dispatched a set of organized subportions 531 due to an interruption followed by generating a next set of organized subportions 531 upon resuming from that interruption, the organization component 541 may analyze the data values of the specified data item 333 used in organizing data set subportions 332 to determine whether the next set of organized subportions 531 is able to be treated by the performance component 542 as simply more of the last set of organized subportions 531 to be dispatched such that the organization of the data set subportions 332 of one simply continues into the other. If so, then those two sets of organized subportions 531 may be effectively combined into a single set of organized subportions 531 by the performance component 542. However, if not, then another thread may be instantiated on which the instructions of the performance component 542 and the calculation portion 112 of the task instructions 110 are independently executed to separately process the data set subportions 332 of the next set of organized subportions 531.

Figure 7A:
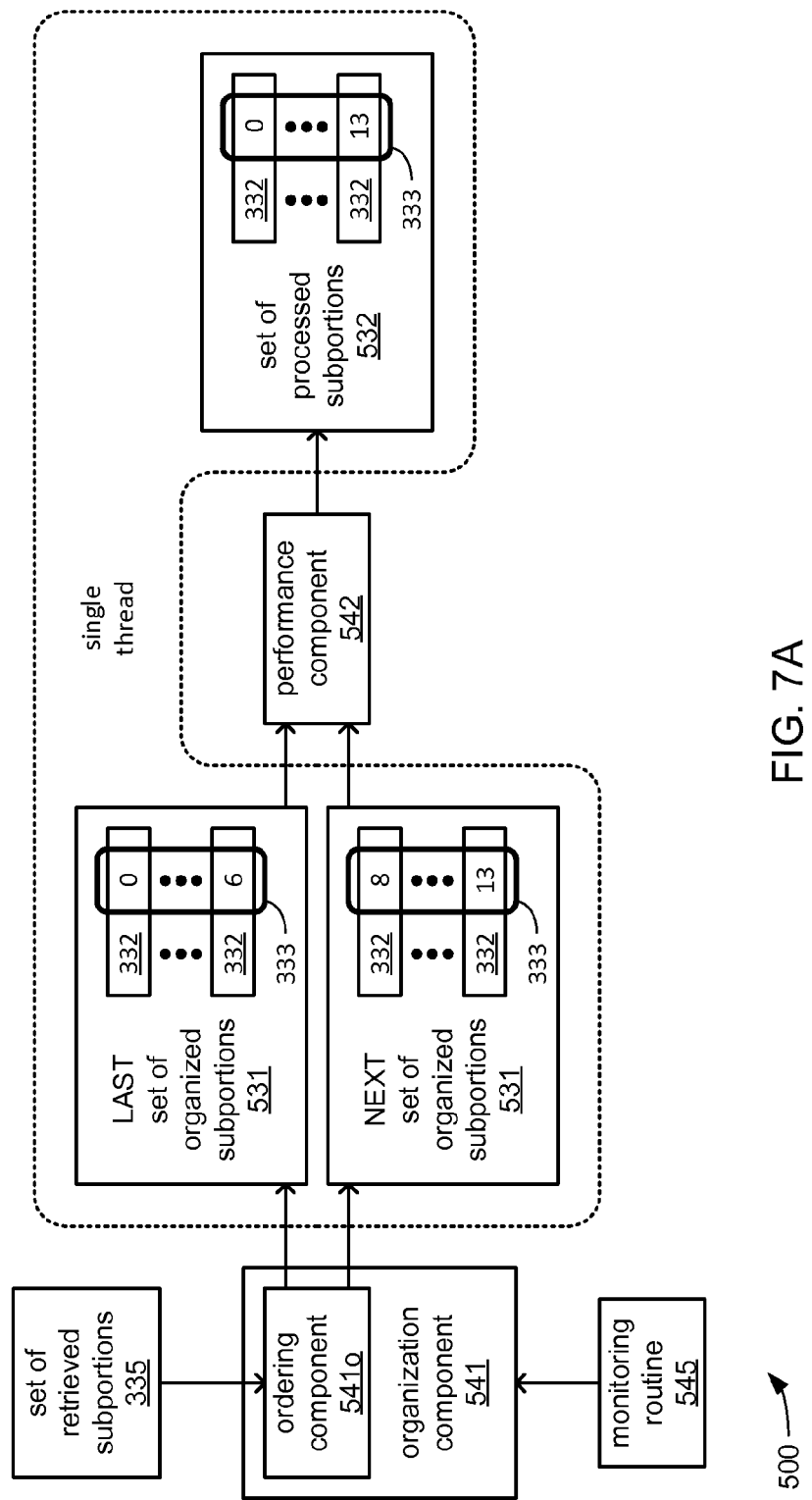
FIGS. 7A and 7B each illustrate an example of dispatching ordered subportions.
Figure 7B:
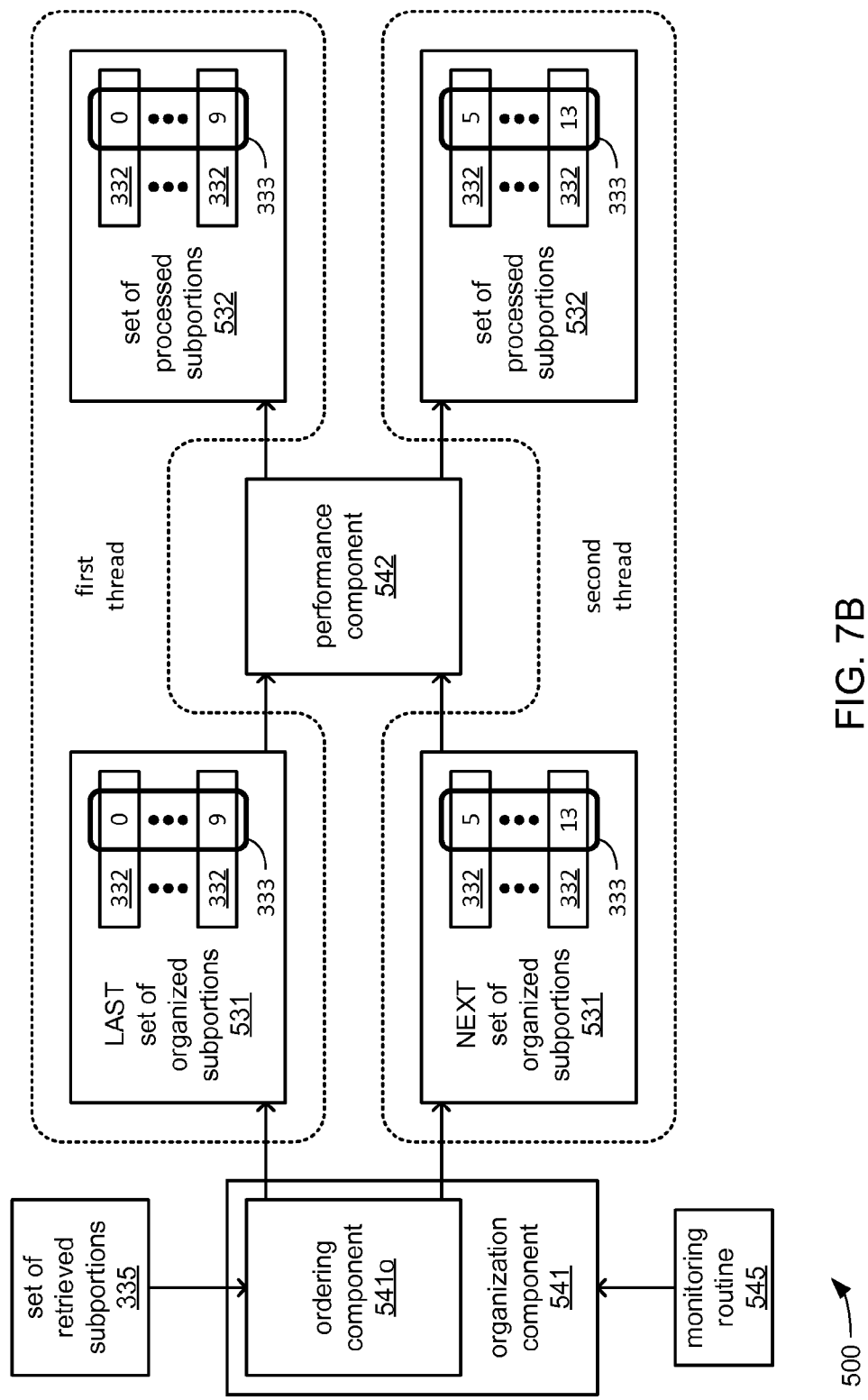

More specifically, where the specified type of organization is ordering based on the data values of a particular data item 333, the organization component 541 may analyze the range of data values for that specified data item 333 that are present in the last set of organized subportions 531 to be dispatched and in the next set of organized subportions 531 to be dispatched to determine whether the range of data values of one set is able to follow the range of data values of the other. FIGS. 7A and 7B, together, depict aspects of examples of determining whether a next set of organized subportions 531 is able to be treated as a continuation of a last set of organized subportions 531 where the specified type of organization is an ascending numerical order.

In the example depicted in FIG. 7A, the depicted range of data values for the specified data item 333 in the last set of organized subportions 531 is an ascending numerical range of 0 to 6, and the range of data values for the same specified data item 333 in the next set of organized subportions 531 is an ascending numerical range of 8 to 13. Upon analyzing these two ranges, the organization component 541 may determine that the ascending numerical range of 8 to 13 is able to follow the ascending numerical range of 0 to 6, and thus the organization component 541 may determine that the next set of organized subportions 531 is able to be treated as a continuation of the last set of organized subportions 531. The organization component 541 may provide an indication of this determination to the performance component 542, which in response, may accept and treat the next set of organized subportions 531 as such a continuation and process the data set subportions 332 thereof following its processing of the data set subportions 332 of the last set of organized subportions 531. Further, the performance component 542 may process the data set subportions 332 of both as inputs to the same performance of the database calculation occurring on the same thread. As depicted, the result may be a single set of processed subportions 532.

In contrast, in the example depicted in FIG. 7B, the depicted range of data values for the specified data item 333 in the last set of organized subportions 531 is an ascending numerical range of 0 to 9, and the range of data values for the same specified data item 333 in the next set of organized subportions 531 is an ascending numerical range of 5 to 13. Upon analyzing these two ranges, the organization component 541 may determine that the ascending numerical range of 5 to 13 at least partially overlaps the ascending numerical range of 0 to 9 such that one cannot follow the other, and thus the organization component 541 may determine that the next set of organized subportions 531 is not able to be treated as a continuation of the last set of organized subportions 531. The organization component 541 may provide an indication of this determination to the performance component 542, which in response, may trigger the instantiation of a second thread on which instructions of the performance component 542 may be independently executed by the processor component 550 to process the next set of organized subportions 531 independently of the processing of the last set of organized subportions 531 that occurs on the first thread. As depicted, the result is may be separate sets of processed subportions 532 that are separately generated from each of the last and next sets of organized subportions 531. In essence, the next set of organized subportions 531 is virtually executed by a separate node device from the last set of organized subportions 531.

Figure 8A:
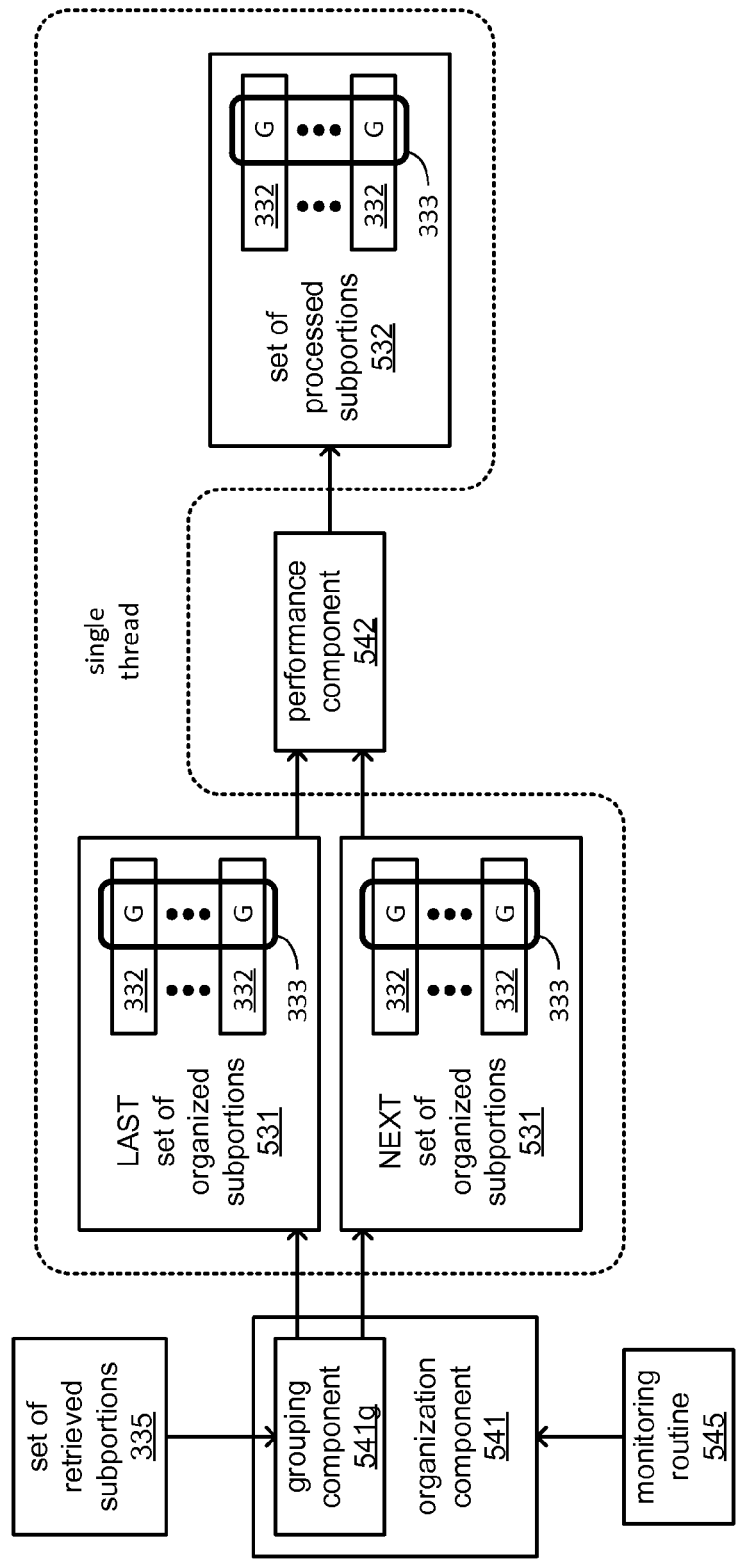
FIGS. 8A and 8B each illustrate an example of dispatching grouped subportions.
Figure 8B:
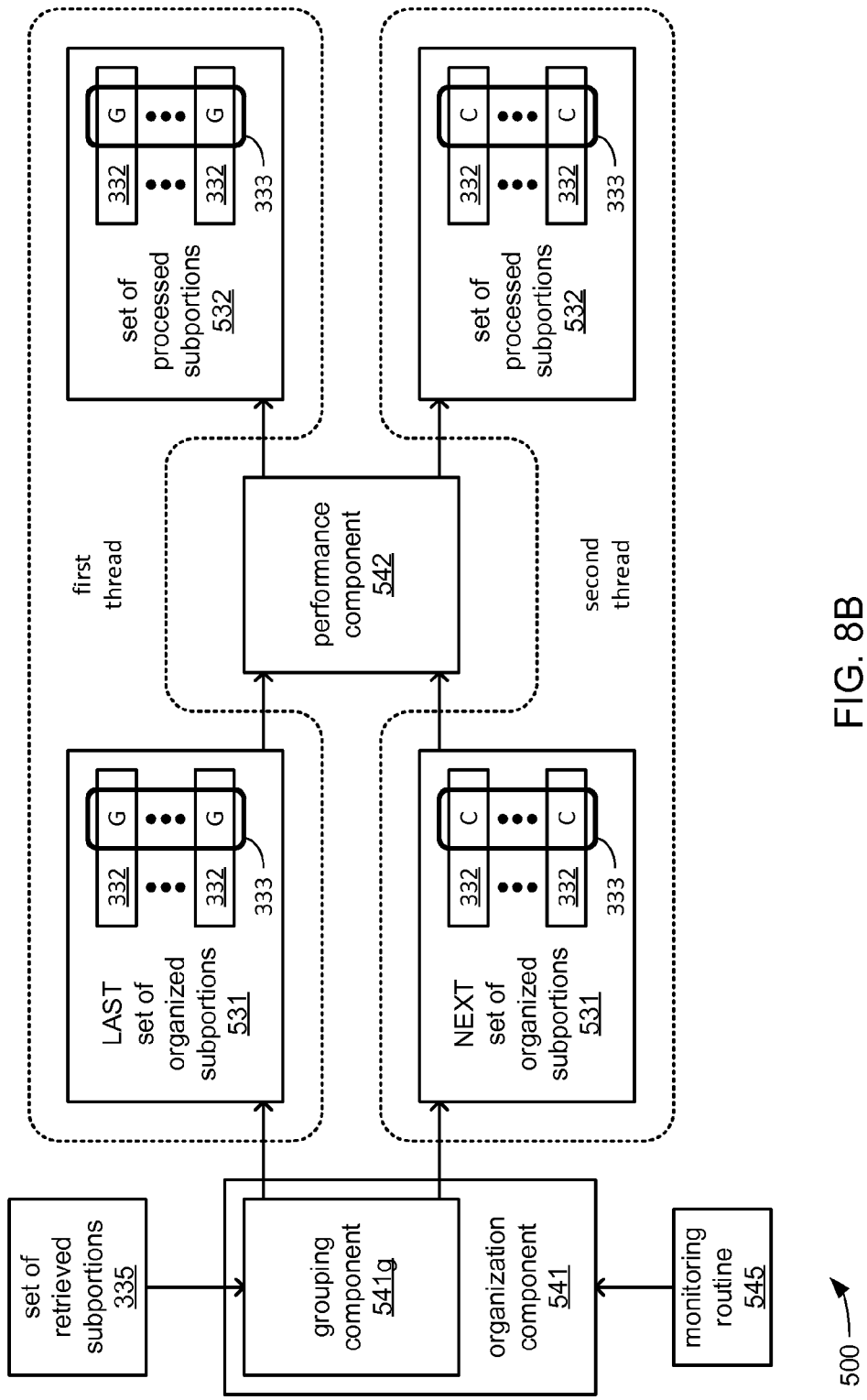

Returning to FIG. 5A, where the specified type of organization is grouping based on the data values of a particular data item 333 and where it is deemed desirable for a single set of organized subportions 531 to be generated for each group of data set subportions 332 (e.g., as depicted in the example of FIG. 6C), the organization component 541 may analyze the data values for that specified data item 333 that are present in the last set of organized subportions 531 to be dispatched and in the next set of organized subportions 531 to be dispatched to determine whether data values of one set are able to follow the data values of the other. FIGS. 8A and 8B, together, depict aspects of examples of determining whether a next set of organized subportions 531 is able to be treated as a continuation of a last set of organized subportions 531 where the specified type of organization is grouping with each set of organized subportions 531 to include data set subportions 332 of only one group.

In the example depicted in FIG. 8A, the data values for the specified data item 333 in the last set of organized subportions 531 all represent the text character G, and the data values for the same specified data item 333 in the next set of organized subportions 531 also all represent the text character G. Upon analyzing these data values, the organization component 541 may determine that there is a match in the data values within these two sets of organized subportions 531, and thus the organization component 541 may determine that the next set of organized subportions 531 is able to be treated as a continuation of the last set of organized subportions 531. The organization component 541 may provide an indication of this determination to the performance component 542, which in response, may accept and treat the next set of organized subportions 531 as such a continuation and process the data set subportions 332 thereof following its processing of the data set subportions 332 of the last set of organized subportions 531. Further, the performance component 542 may process the data set subportions 332 of both as inputs to the same performance of the database calculation occurring on the same thread. As depicted, the result may be a single set of processed subportions 532.

In contrast, in the example depicted in FIG. 8B, the depicted data values for the specified data item 333 in the last set of organized subportions 531 all represent the text character G, and the range of data values for the same specified data item 333 in the next set of organized subportions 531 all represent the text character of C. Upon analyzing these data values, the organization component 541 may determine that there is no match in the data values within these two sets of organized subportions 531, and thus the organization component 541 may determine that the next set of organized subportions 531 is not able to be treated as a continuation of the last set of organized subportions 531. The organization component 541 may provide an indication of this determination to the performance component 542, which in response, may trigger the instantiation of a second thread on which instructions of the performance component 542 may be independently executed by the processor component 550 to process the next set of organized subportions 531 independently of the processing of the last set of organized subportions 531 that occurs on the first thread. As depicted, the result is may be separate sets of processed subportions 532 that are separately generated from each of the last and next sets of organized subportions 531. Again, in essence, the next set of organized subportions 531 is virtually executed by a separate node device from the last set of organized subportions 531.

Figure 9A:
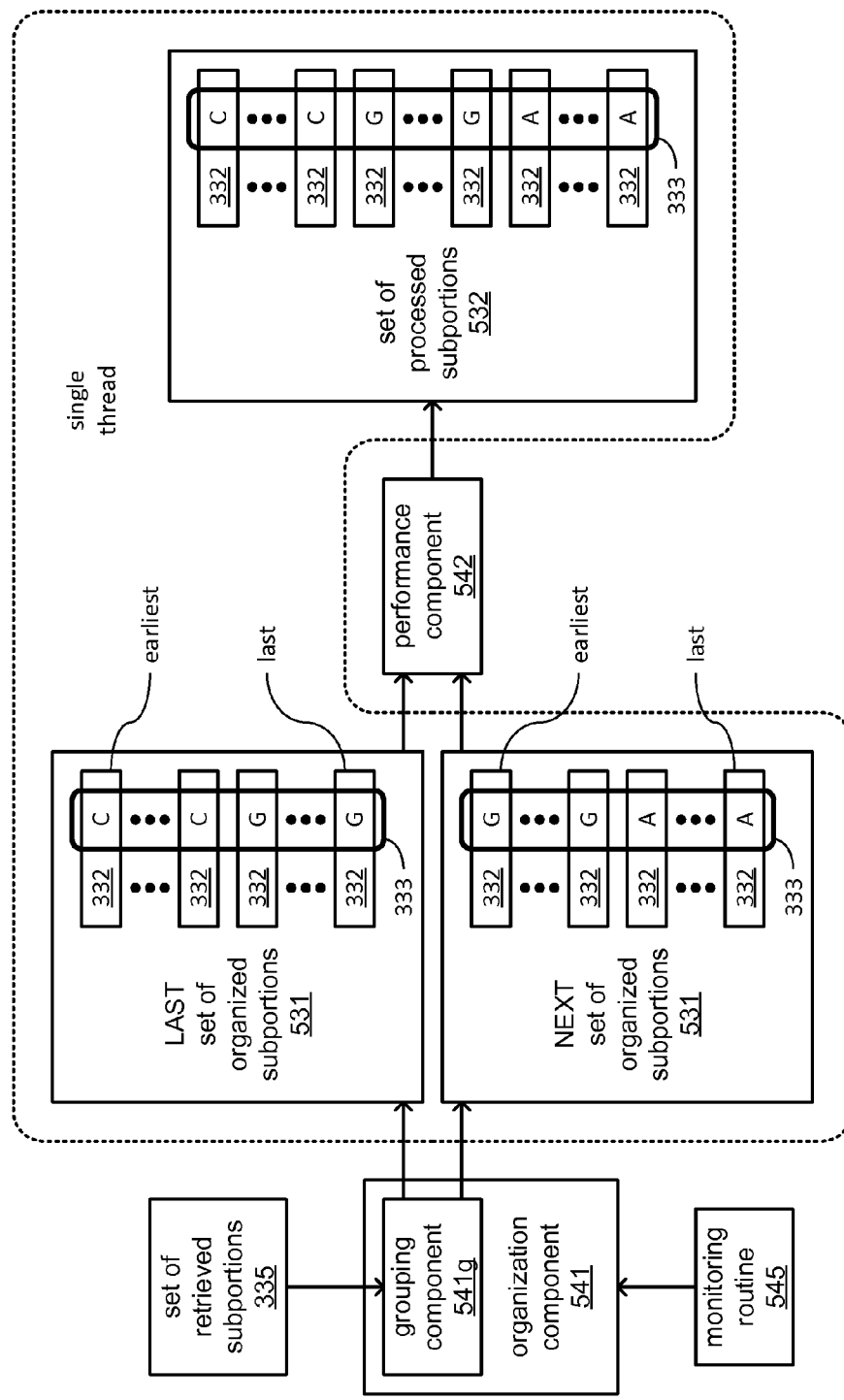
FIGS. 9A and 9B each illustrate an alternate example of dispatching grouped subportions.
Figure 9B:
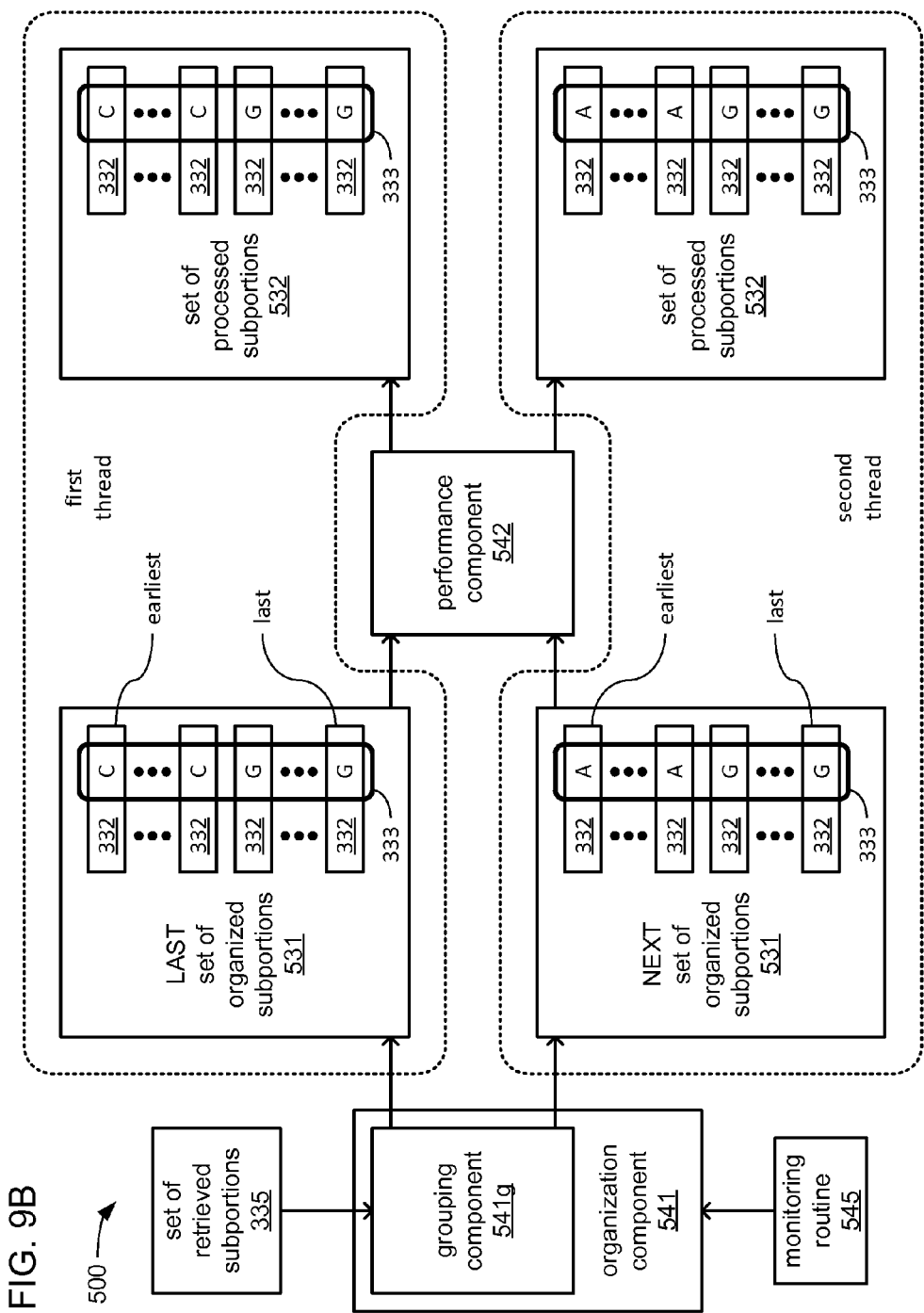

Returning to FIG. 5A, where the specified type of organization is grouping based on the data values of a particular data item 333 and where it is deemed desirable for a single set of organized subportions 531 to include multiple groups of data set subportions 332 (e.g., as depicted in the example of FIG. 6B), the organization component 541 may analyze the data values for that specified data item 333 that are present in the last set of organized subportions 531 to be dispatched and in the next set of organized subportions 531 to be dispatched to determine whether data values of one set are able to follow the data values of the other. FIGS. 9A and 9B, together, depict aspects of examples of determining whether a next set of organized subportions 531 is able to be treated as a continuation of a last set of organized subportions 531 where the specified type of organization is grouping. However, unlike the examples of FIGS. 8A and 8B, the examples of FIGS. 9A and 9B include the ability to combine multiple groups of data set subportions 332 in a single set of organized subportions 531.

In the example depicted in FIG. 9A, the earlier ones of the data set subportions 332 stored within the last set of organized subportions 531 (including the earliest one so stored) by the organization component 541 share a data value representing the text character C for the specified data item 333, while the later ones of the data set subportions 332 stored within the last set of organized subportions 531 (including the last one so stored) share a data value representing the text character G. As previously discussed, each of the sets of organized subportions 531 may be operated in a manner akin to a FIFO buffer such that there may be significance to the order in which data set subportions 332 are stored therein. As a result, the ones of the data set subportions 332 that share the data value representing the text character C for the specified data item 333 may be retrieved from the last set of organized subportions 531 and processed by the performance component 542 before any of the data set subportions 332 that share the data value representing the text character G.

As also depicted in FIG. 9A, the earlier ones of the data set subportions 332 stored within the next set of organized subportions 531 (including the earliest one so stored) by the organization component 541 share a data value representing the text character G for the specified data item 333, while the later ones of the data set subportions 332 stored within the next set of organized subportions 531 (including the last one so stored) share a data value representing the text character A. As a result, the ones of the data set subportions 332 that share the data value representing the text character G for the specified data item 333 may be retrieved from the next set of organized subportions 531 and processed by the performance component 542 before any of the data set subportions 332 that share a data value representing the text character A.

Upon analyzing these data values, the organization component 541 may determine that there is a match in the data values within these two sets of organized subportions 531, specifically, a match for the data value associated with the text character G. Also upon analyzing these data values, the organization component 541 may further determine that the match includes the last data set subportion 332 stored within the last set of organized subportions 531 and the first data set subportion 332 stored within the next set of organized subportions 531. As a result, the organization component 541 may determine that the next set of organized subportions 531 is able to be treated as a continuation of the last set of organized subportions 531. The organization component 541 may provide an indication of this determination to the performance component 542, which in response, may accept and treat the next set of organized subportions 531 as such a continuation and process the data set subportions 332 thereof following its processing of the data set subportions 332 of the last set of organized subportions 531. Further, the performance component 542 may process the data set subportions 332 of both as inputs to the same performance of the database calculation occurring on the same thread. As depicted, the result may be a single set of processed subportions 532.

In contrast, in the example depicted in FIG. 9B, while the arrangement of data set subportions 332 of the last set of organized subportions 531 depicted in FIG. 9B is the same as depicted in FIG. 9A, the arrangement of data set subportions 332 stored within the next set of organized subportions 531 depicted in FIG. 9B differs from what is depicted in FIG. 9A. Specifically, the earlier ones of the data set subportions 332 stored within the next set of organized subportions 531 (including the earliest one so stored) by the organization component 541 share a data value representing the text character A for the specified data item 333, while the later ones of the data set subportions 332 stored within the next set of organized subportions 531 (including the last one so stored) share a data value representing the text character G. As a result, the ones of the data set subportions 332 that share the data value representing the text character A for the specified data item 333 may be retrieved from the next set of organized subportions 531 and processed by the performance component 542 before any of the data set subportions 332 that share a data value representing the text character G.

Upon analyzing these data values, the organization component 541 may determine that there is a match in the data values within these two sets of organized subportions 531, specifically, a match for the data value associated with the text character G. However, upon further analyzing these data values, the organization component 541 may further determine that the match does not include the last data set subportion 332 stored within the last set of organized subportions 531 and the first data set subportion 332 stored within the next set of organized subportions 531. As a result, the organization component 541 may determine that the next set of organized subportions 531 is not able to be treated as a continuation of the last set of organized subportions 531. The organization component 541 may provide an indication of this determination to the performance component 542, which in response, may trigger the instantiation of a second thread on which instructions of the performance component 542 may be independently executed by the processor component 550 to process the next set of organized subportions 531 independently of the processing of the last set of organized subportions 531 that occurs on the first thread. Again, as depicted, the result is may be separate sets of processed subportions 532 that are separately generated from each of the last and next sets of organized subportions 531.

In various embodiments, each of the processor components 150, 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked. However, in a specific embodiment, the processor component 550 of one or more of the node devices 500 may incorporate multi-threaded capabilities that may be implemented with multiple processing cores such that one or more additional threads to separately process one or more sets of organized subportions 531 may be distributed among multiple processing cores.

In various embodiments, each of the storages 160, 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the storage 360 of one or more of the storage devices 300 that stores a data set portion 331 or the storage 560 of one or more of the node devices 500 that stores a data set portion 331 may be implemented with a redundant array of independent discs (RAID) of a RAID level selected to provide fault tolerance to prevent loss of a data set portion 331 and/or to provide increased speed in accessing a data set portion 331.

In various embodiments, the network interfaces 190, 390, 590 and 790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, the network interface 390 of one or more of the storage devices 300 that stores a data set portion 331 or the network interface 590 of one or more of the node devices 500 that stores a data set portion 331 may be implemented with multiple copper-based or fiber-optic based network interface ports to provide redundant and/or parallel pathways in exchanging data set subportions 332.

Figure 10A:
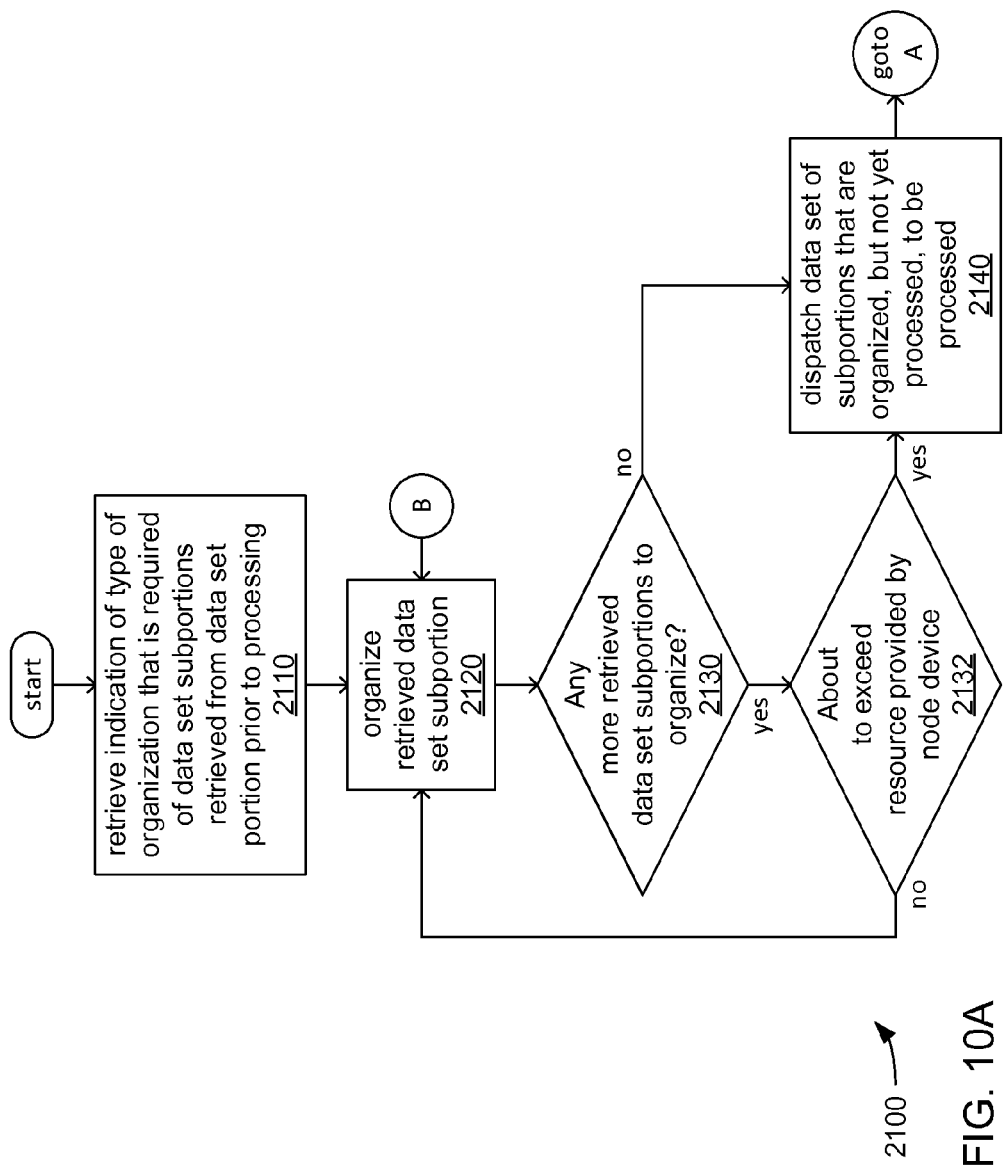
FIGS. 10A and 10B, together, illustrate an example embodiment of a logic flow of performing a database calculation.
Figure 10B:
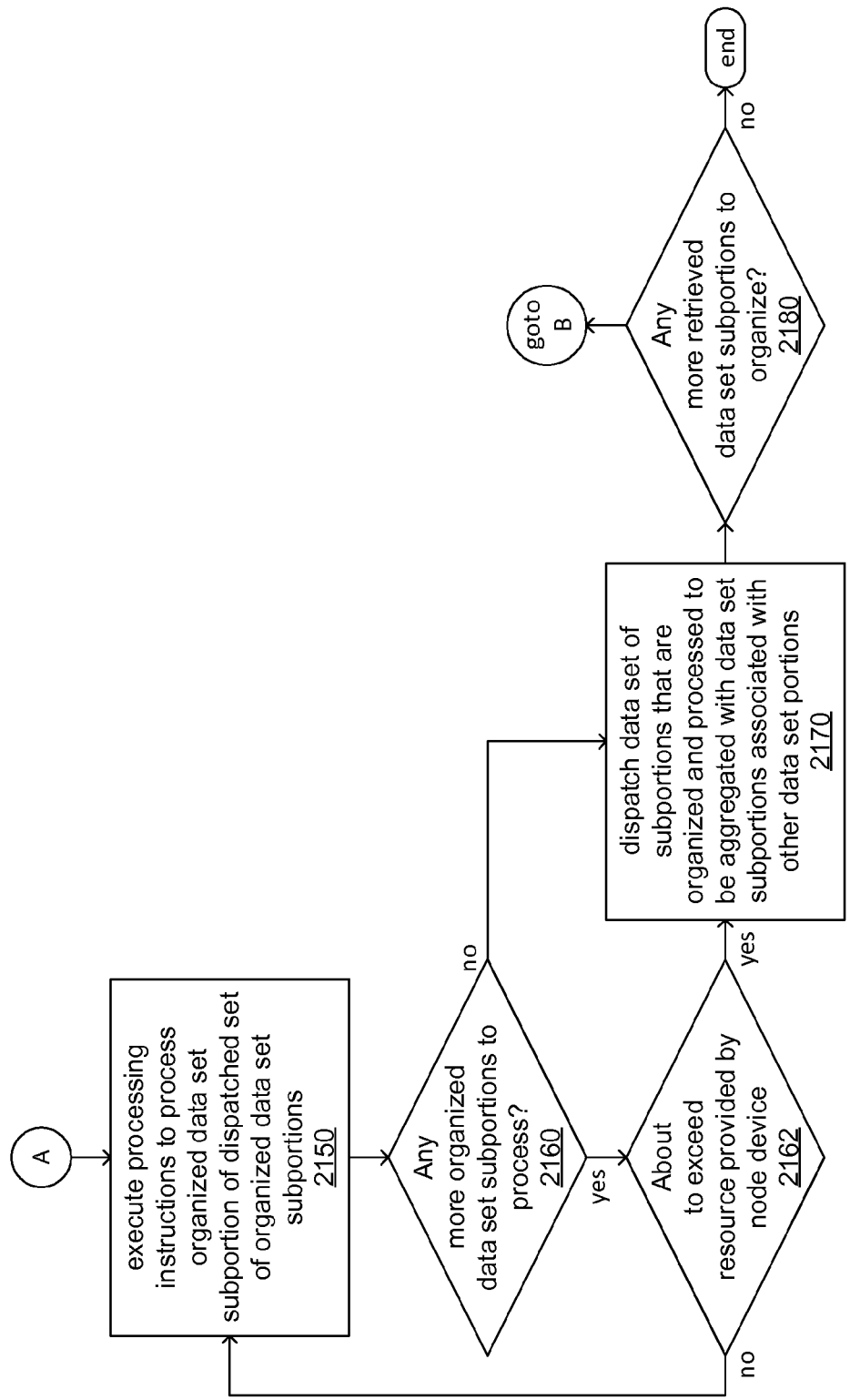

FIGS. 10A and 10B, together, illustrate an example embodiment of a logic flow 2100. The logic flow 2100 may be representative of some or all of the operations executed by one or more embodiments described herein. More specifically, the logic flow 2100 may illustrate operations performed by the processor component 550 in executing the execution routine 540, and/or performed by other component(s) of at least one of the node devices 500.

At 2110, a processor component of a node device (e.g., the processor component 550 of one or more of the node devices 500) may retrieve from task instructions (e.g., the task instructions 110) an indication of the type of organization that is required of multiple data set subportions retrieved from at least a portion of a data set (e.g., a set of retrieved subportions 335 that have been retrieved from at least one data set portion 331 of the data set 330) prior to their use as inputs to processing to perform a database calculation. As has been discussed, such organization may be an ordering of retrieved data set subportions in accordance with a specified order of data values of a data item within each of those data set subportions (e.g., an alphabetical or numerical order of one data item 333). However, as has also been discussed, such organization may be a grouping of retrieved data set subportions into groups based on matching data values of a data item.

At 2120, the processor component may organize at least one retrieved data set subportion in accordance with the specified type of organization. At 2130, a check may be made as to whether there are any more retrieved data set subportions that have not yet been so organized. If there are more, then a check may be made at 2132 as to whether a level of availability of a resource of the node device that is needed to perform such organization has fallen below a threshold for determining whether its limit is about to be reached. If not, then another retrieved data set subportion may be organized at 2120. Again, such resources may include, and are not limited to, one or more of processing resources, memory space within a storage of the node device or available network interface bandwidth.

However, if there are no more retrieved data set subportions to organize at 2130 or if the level of availability of such a resource has fallen below such a threshold at 2132, then the one or more retrieved data set subportions that have been organized so far may be dispatched as a set of organized data set subportions (e.g., a set of organized subportions 531) to be processed in a performance of the database calculation at 2140. As has been discussed, such dispatching of organized, but not yet processed, data set subportions to be so processed may aid in reducing demand for resources provided by the node device, such as memory storage space required to store those organized, but not yet processed, data set subportions.

Following such dispatching of a set of organized data set subportions at 2140, the processor component may execute instructions of the task instructions to process an organized data set subportion of that dispatched set of organized data set subportions as an input in performing the database calculation at 2150. At 2160, a check may be made as to whether there are any more organized data set subportions that have not yet been so processed. If there are more, then a check may be made at 2162 as to whether a level of availability of a resource of the node device that is needed to perform such processing has fallen below a threshold for determining whether its limit is about to be reached. If not, then another organized data set subportion may be processed at 2150.

However, if there are no more organized data set subportions to process as inputs to perform the database calculation at 2160, or if the level of availability of such a resource has fallen below such a threshold at 2162, then the one or more organized data set subportions that have been processed so far may be dispatched as a set of processed data set subportions (e.g., a set of processed subportions 532) to be aggregated with processed data set subportions associated with other data set portions at 2170. As has been discussed, such dispatching of processed data set subportions to be aggregated may aid in reducing demand for resources provided by the node device, such as memory storage space required to store those processed data set subportions. As has also been discussed, such aggregation may take place within a single one of the node devices such that all processed data set subportions are transmitted thereto, or each of the node devices may perform part of the aggregation to minimize network traffic.

Following such dispatching of processed data set subportions at 2170, a check may be made at 2180 as to whether there are any more data set subportions that have been retrieved from a data set portion (e.g., any data set subportions 332 of the set of retrieved subportions 335), but that have not yet been organized in preparation for being so processed. If there are more, then another retrieved data set subportion is organized at 2120.

Figure 11:
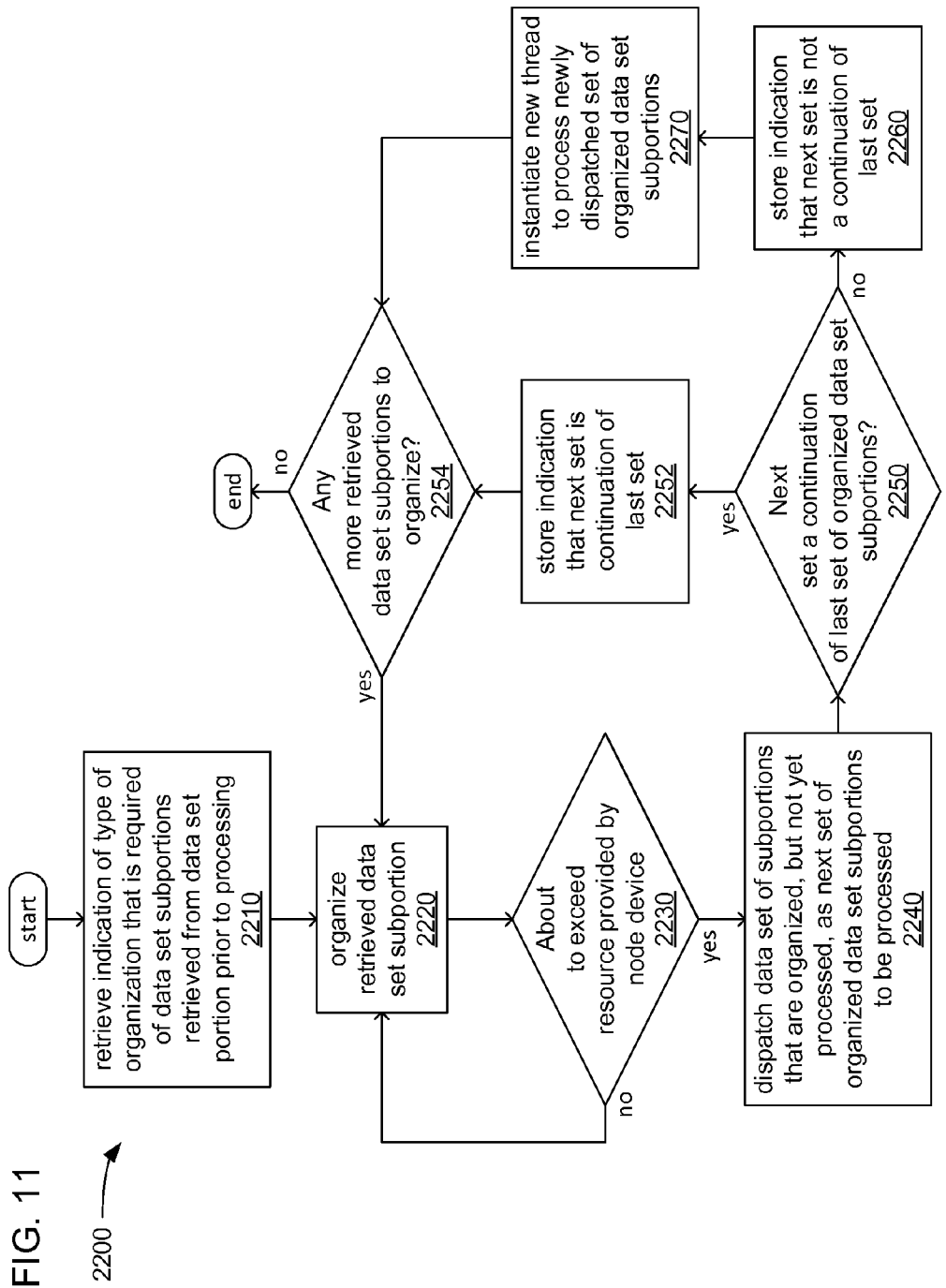
FIG. 11 illustrates an example embodiment of a logic flow of organizing retrieved data set subportions in preparation for performing a database calculation on one or more threads.

FIG. 11 illustrates an example embodiment of a logic flow 2200. The logic flow 2200 may be representative of some or all of the operations executed by one or more embodiments described herein. More specifically, the logic flow 2200 may illustrate operations performed by the processor component 550 in executing the execution routine 540, and/or performed by other component(s) of at least one of the node devices 500.

At 2210, a processor component of a node device (e.g., the processor component 550 of one or more of the node devices 500) may retrieve from task instructions (e.g., the task instructions 110) an indication of the type of organization that is required of data set subportions retrieved from at least a portion of a data set (e.g., the set of retrieved subportions 335 retrieved from at least one data set portion 331 of the data set 330) prior to their use as inputs to processing to perform a database calculation. At 2220, the processor component may organize at least one retrieved data set subportions in accordance with the specified type of organization.

At 2230, a check may be made as to whether a level of availability of a resource of the node device that is needed to perform such organization has fallen below a threshold for determining whether its limit is about to be reached. If not, then another retrieved data set subportion (e.g., another data set subportions 332 of a set of retrieved subportions 335) may be organized at 2220. Again, such resources may include, and are not limited to, one or more of processing resources, memory space within a storage of the node device or available network interface bandwidth. However, if the level of availability of such a resource has fallen below such a threshold at 2230, then the one or more retrieved data set subportions that have been organized so far may be dispatched as a next set of organized data set subportions (e.g., a set of organized subportions 531) to be processed in a performance of the database calculation at 2240.

At 2250, a check may be made as to whether the set of organized data set subportions just dispatched as the next set is able to be treated as a continuation of the last set of organized data set subportions to be dispatched. As previously discussed, where the type of organization specified in the task instructions is one that follows a specified order of data values for a specified data item (e.g., a numerical or alphabetical order for data values of a data item 333 specified in the preparation portion 111 of the task instructions 110), a next set of organized data set subportions may be treated as a continuation of the last set if the range of data values for that data item in the next set is able to follow the range of values for that same data item in the last set. As also previously discussed, where the type of organization specified in the task instructions is one that entails grouping retrieved data set subportions by matching data values for a specified data item, a next set of organized data set subportions may be treated as a continuation of the last set if the next set includes a data value for that data item that matches a data value for that data item in the last set.

If, at 2250, the just dispatched next set of organized data set subportions is able to be treated as a continuation of the last set, then the processor component may store an indication that the next set is a continuation of the last set at 2252. As discussed, this may allow the next set to be used together with the last set as combined inputs to a thread of processing to perform the database calculation. Following such marking of the next set as a continuation of the last set, a check may be made at 2254 as to whether there are any more retrieved data set subportions (e.g., any more data set subportions 332 in a set of retrieved subportions 335) that have not yet been organized. If there are more, then another retrieved data set subportion is organized at 2220.

However, if at 2250, the just dispatched next set of organized data set subportions is not able to be treated as a continuation of the last set, then the processor component may store an indication that the next set is not a continuation of the last set at 2260. As discussed, such a marking of the next set may trigger processing of the next set as inputs to a performance of the database calculation that is separate from any performance of the database calculation using the last set as inputs. Stated differently, the next set is so processed in a manner that is akin to being transmitted to a different node device for such processing, although the next set is not transmitted to another node device. However, as also discussed, such separate processing of the next set may entail instantiating a new thread on which such processing of the next set is to be performed, where the new thread is separate from the thread on which the last set is so processed.

Following such marking of the next set as not being a continuation of the last set, such a new thread may be so instantiated at 2270 for the processing of the next set of organized data set subportions as inputs to such a separate performance of the database calculation. Then, the check may be made at 2254 as to whether there are any more retrieved data set subportions (e.g., any more data set subportions 332 in a set of retrieved subportions 335) that have not yet been organized. If there are more, then another retrieved data set subportion is organized at 2220.

Figure 12:
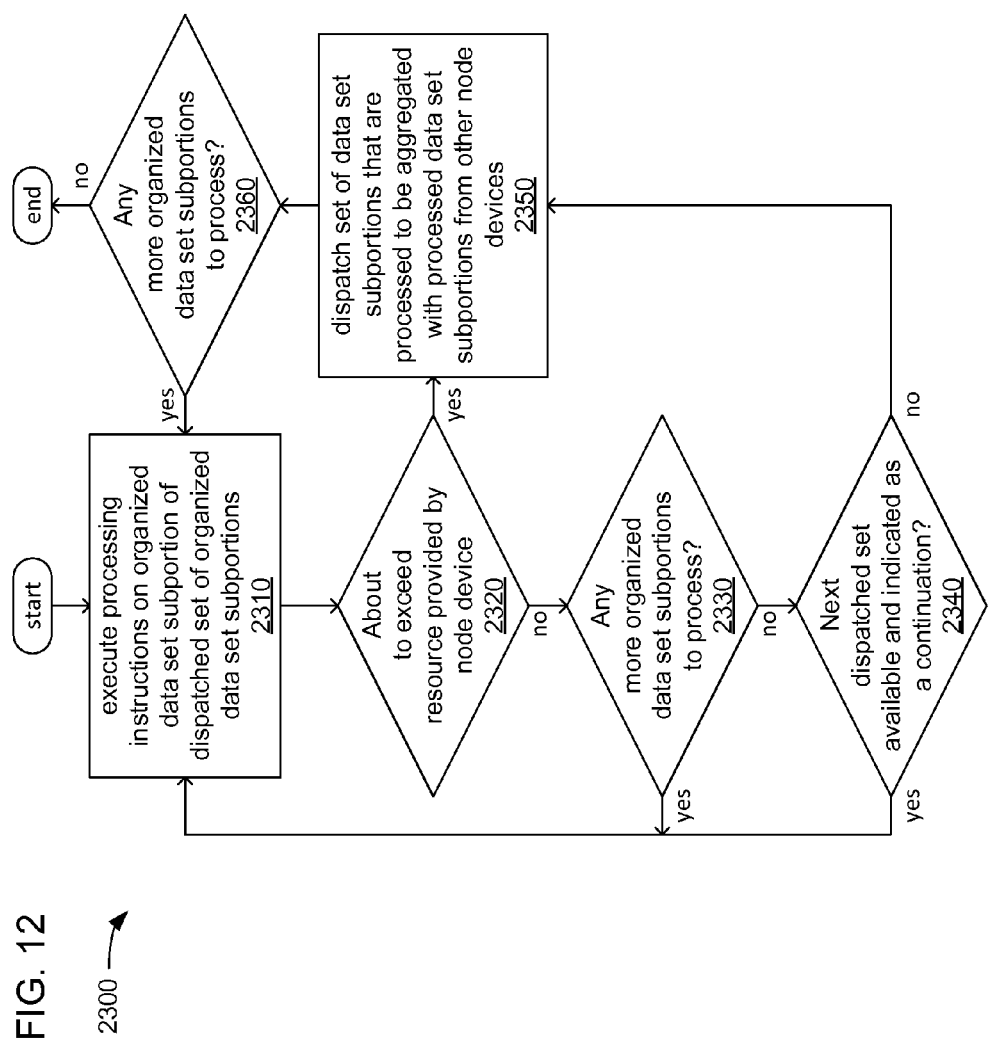
FIG. 12 illustrates an example embodiment of a logic flow of performing a database calculation on one or more sets of organized data set subportions on a single thread.

FIG. 12 illustrates an example embodiment of a logic flow 2300. The logic flow 2300 may be representative of some or all of the operations executed by one or more embodiments described herein. More specifically, the logic flow 2300 may illustrate operations performed by the processor component 550 in executing the execution routine 540, and/or performed by other component(s) of at least one of the node devices 500.

At 2310, a processor component of a node device (e.g., the processor component 550 of one or more of the node devices 500) may execute a portion of task instructions (e.g., the task instructions 110) to process an organized data set subportion of a set of organized data set subportions (e.g., a data set subportion 332 of a set of organized subportions 531) as an input to performing a database calculation in a single thread of processing. As previously discussed, the database calculation may be any of a variety of types of calculation using data values of data items of a data set as inputs (e.g., data values of data items 333 of a data set 330). As has also been discussed, the database calculation may be broken up into numerous parts performed in a distributed and at least partially parallel manner on numerous threads distributed across numerous node devices.

At 2320, a check may be made as to whether a level of availability of a resource of the node device that is needed to perform such processing has fallen below a threshold for determining whether its limit is about to be reached. If so, then the one or more organized data set subportions that have been processed so far may be dispatched at 2350 as a set of processed data set subportions (e.g., a set of processed subportions 532) to be aggregated with other sets of processed data set subportions generated by performances of the database calculation on one or more other threads and/or among one or more other node devices.

However, if at 2320 the level of availability of a resource of the node device has not fallen below such a threshold, then a check may be made at 2330 as to whether there are any more organized data set subportions in that same set of organized data set subportions (e.g., any more data set subportions 332 of a set of organized subportions 531) to process. If so, then another of the organized data set subportions of that same set may be processed on the same single thread as an input to the database calculation at 2310.

However, if at 2330 there are no more organized data set subportions in that same set of organized data set subportions (e.g., another data set subportion 332 of a last set of organized subportions 531) to process, then a check may be made at 2340 as to whether there is a next set of organized data set subportions (e.g., a next set of organized subportions 531) that is available to be processed and is indicated as being able to be processed as a continuation of the set of organized data set subportions of which an organized data set subportion was just processed at 2310. If so, then that next set may be treated as such a continuation and an organized data set subportion of that next set may be processed at 2310 on the same single thread just as the last organized data set subportion of the last set was.

However, if at 2340 there isn't yet a next set of organized data set subportions available (e.g., a next set of organized subportions 531), or if an available next set is indicated not being able to be processed as a continuation of the last set, then the one or more organized data set subportions that have been processed so far may be dispatched as a set of processed data set subportions (e.g., a set of processed subportions 532) to be aggregated with processed data set subportions associated with other data set portions at 2350. As has been discussed, if the next set of organized subportions that has been dispatched for processing is not indicated as being able to be treated as a continuation of the last set, then an entirely separate thread may be instantiated to support processing of the organized data set subportions of the next set as inputs to an entirely separate performance of the database calculation. In effect, and as previously discussed, such an instantiation of another thread for such a separate performance of the database calculation may be akin to transmitting the next set to a different node device to be processed in a performance of the database calculation, although the next set may not actually be so transmitted.

Following such dispatching of a set of processed data set subportions at 2350 (e.g., a set of processed subportions 532), a check may be made at 2360 as to whether there are any more organized data set subportions that have not yet been processed (e.g., any more data set subportions 332 of a set of organized subportions 531). If there are more, then another organized data set subportion may be processed as an input to the database calculation at 2310.

Figure 13:
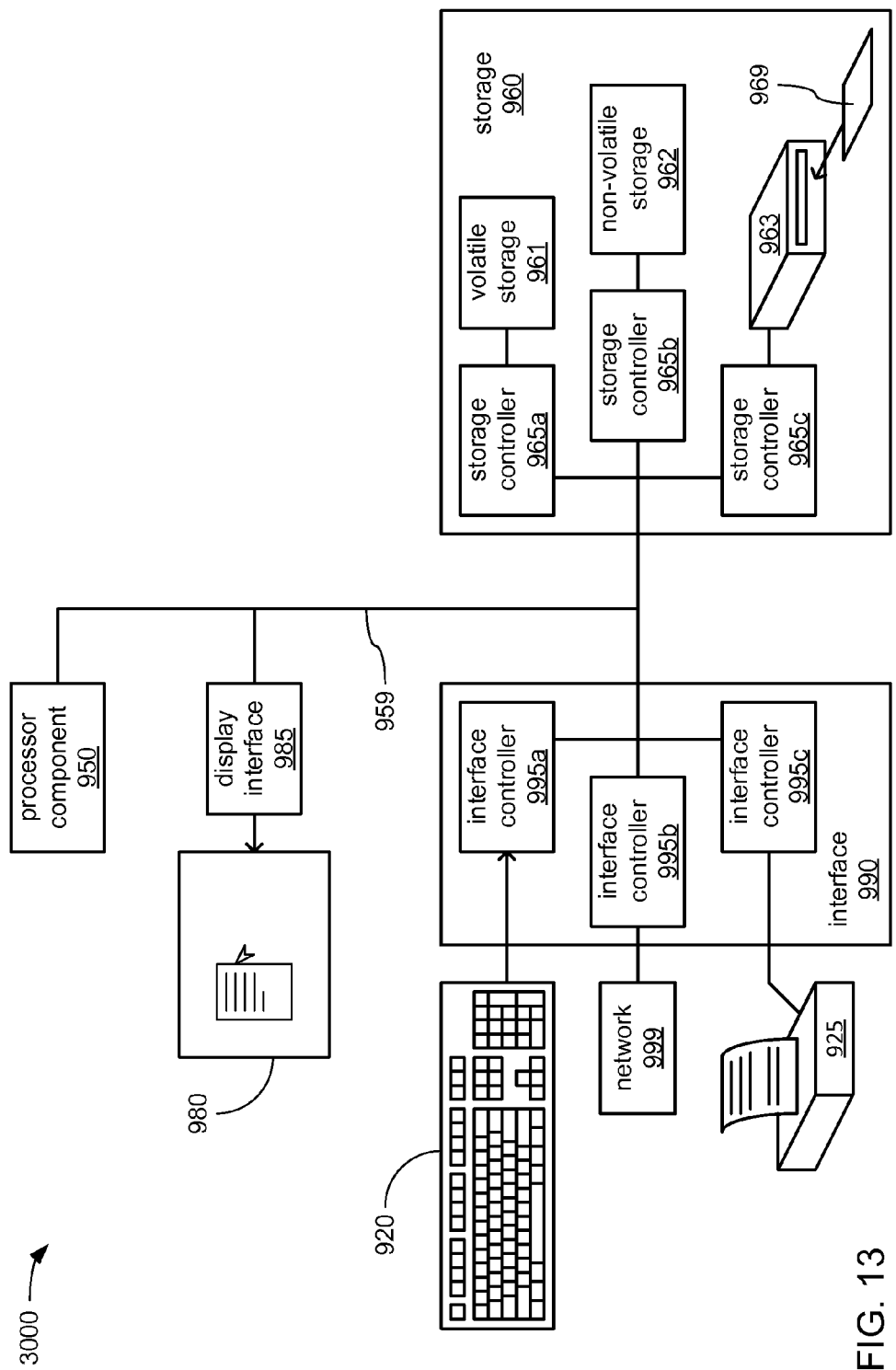
FIG. 13 illustrates an example embodiment of a processing architecture.

FIG. 13 illustrates an example embodiment of a processing architecture 3000 suitable for implementing various embodiments as previously described. More specifically, various aspects and/or portions of the processing architecture 3000 (or variants thereof) may be implemented as part of one or more of the devices 100, 300, 500 or 700. It should be noted that components of the processing architecture 3000 are given reference numbers in which the last two digits correspond to the last two digits of reference numbers of at least some of the components earlier depicted and described as part of the devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component of a software routine can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program. Further, one or more components of a software routine may alternately be replaced by hardware-implemented logic, including and not limited to, application-specific integrated circuits (ASICs), programmable logic devices (PLDs) and/or combinational logic implemented with transistors. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 350, 550 and 750) may include any of a wide variety of commercially available processors, employing any of a wide variety of technologies and implemented with one or more cores physically combined in any of a number of ways.

As previously discussed, the storage 960 (corresponding to one or more of the storages 160, 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to one or more of the network interfaces 190, 390, 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, which may correspond to the display 180 and/or the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
   a processor component;
   a network interface to couple the processor component to a network to receive task instructions to perform a computation with data set subportions within a data set portion as an input to the computation;
   an organization component for execution by the processor component to retrieve from the task instructions an indication of a type of organization required of the data set subportions prior to performance of the computation and a data item within each data set subportion by which the data set subportions are to be organized, wherein:
     the type of organization comprises at least one of ordering or grouping the data set subportions of the data set portion by the data item;
     for each data set subportion of the data set portion, the organization component is to:
       organize the data set subportion among others of the data set subportions within the data set portion based on the data item and the indicated type of organization; and
       monitor an availability of a first processing resource and a first storage resource of a node device employed to organize the data set subportion; and
     based on insufficient availability of at least one of the first processing resource or the first storage resource, the organization component is to interrupt the organization of the data set subportions, and dispatch a first set of one or more organized data set subportions to be processed;
   a performance component for execution by the processor component to, for each organized data set subportion of the first set, execute the task instructions to process the organized data set subportion; and
   a completion component for execution by the processor component to operate the network interface to transmit one or more processed data set subportions processed from the first set to another device via the network as part of aggregating the processed data set subportions with other processed data set subportions associated with another data set portion, and to trigger a return to organization of another data set subportion of the data set portion not yet organized by the organization component to generate a second set of one or more organized data set subportions.

2. The apparatus of claim 1, the performance component to:
   for each organized data set subportion of the first set, monitor the availability of a second processing resource and a second storage resource of the node device employed in processing the organized data set subportion; and
   based on insufficient availability of at least one of the second processing resource and the second storage resource, interrupt the processing of the organized data set subportions of the first set, transmit a subset of the processed data set subportions processed from the first set to the other device, and return to processing each data set subportion of the first set not yet processed.

3. The apparatus of claim 1, the completion component to:
   before transmission of the one or more processed data set subportions processed from the first set to the other device, determine whether a second set of organized data set subportions has been dispatched to be processed and determine whether the second set is indicated as a continuation of the first set; and
   operate the network interface to transmit the one or more processed data set subportions processed from the first set to the other device based on at least one of a determination that a second set has not been dispatched or that the second set is not a continuation of the first set.

4. The apparatus of claim 3, wherein based on a determination that the second set has been dispatched and is a continuation of the first set:
   the performance component is to, for each organized data set subportion of the second set, execute the task instructions to process the organized data set subportion; and
   the completion component is to operate the network interface to transmit the processed data set subportions processed from the first set combined with the processed data set subportion processed from the second set to the other device.

5. The apparatus of claim 1, the organization component to:
   for each data set subportion of the data set portion to be organized into the second set, organize the data set subportion among others of the data set subportions within the data set portion based on the data item and the indicated type of organization, monitor the availability of the first processing resource and the first storage resource, and monitor an amount of data set subportions of the data set portion not yet organized;
   based on at least one of insufficient availability of the first processing resource, insufficient availability of the first storage resource or depletion of the amount of data set subportions of the data set portion not yet organized, interrupt the organization of the data set subportions into the second set, and dispatch the second set to be processed;

based on the data item of each of the organized data set subportions of the second set, determine whether the second set is a continuation of the first set; and store an indication that the second set is a continuation of the first set based on the determination.

6. The apparatus of claim 5, wherein:

the performance component is to instantiate a second thread in which to execute the task instructions to process each organized data set subportion in the second set separately from a first thread in which the task instructions are executed to process each organized data set subportion in the first set based on a determination that the second set is not a continuation of the first set, and for each organized data set subportion of the second set, execute the task instructions within the second thread to process the organized data set subportion; and the completion component is to transmit the processed data set subportions processed from the second set to the other device.

7. The apparatus of claim 5, wherein:

the indicated type of organization comprises ordering the data set subportions of the data set portion by the data item; and the organization component is to determine whether the second set is a continuation of the first set based on whether a range of values of the data item in each organized data set subportion in the second set intersects with a range of values of the data item in each organized data set subportion in the first set.

8. The apparatus of claim 5, wherein:

the indicated type of organization comprises grouping the data set subportions of the data set portion into one or more groups that each share a different value for the data item; and the organization component is to determine whether the second set is a continuation of the first set based on whether the value shared by a group of one or more organized data set subportions in the second set is also shared by a group of one or more organized data set subportions in the first set.

9. The apparatus of claim 1, the completion component to:

receive processed data set subportions from another node device via the network; and transmit the processed data set subportions processed from the first set combined with the processed data set subportions received from the other node device to the other device.

10. The apparatus of claim 1, wherein the other device is a storage device that stores a data set that comprises the data set portion and that is to store the one or more processed data set subportions processed from the first set, and the apparatus comprises a communications component for execution by the processor component to receive the data set portion from the other device.

11. A computer-program product tangibly embodied in a non-transitory machine-readable storage medium, the computer-program product including instructions operable to cause a processor component to perform operations including:

receive, at a node device, task instructions to perform a computation with data set subportions within a data set portion as an input to the computation;

retrieve from the task instructions an indication of a type of organization required of the data set subportions prior to performance of the computation and a data item within each data set subportion by which the data set subportions are to be organized, wherein the type of organization comprises at least one of ordering or grouping the data set subportions of the data set portion by the data item;

for each data set subportion of the data set portion, organize the data set subportion among others of the data set subportions within the data set portion based on the data item and the indicated type of organization, and monitor an availability of a first processing resource and a first storage resource of the node device employed to organize the data set subportion;

based on insufficient availability of at least one of the first processing resource or the first storage resource, interrupt the organization of the data set subportions, and dispatch a first set of one or more organized data set subportions to be processed;

for each organized data set subportion of the first set, execute the task instructions to process the organized data set subportion;

transmit one or more processed data set subportions processed from the first set to another device via a network as part of aggregating the processed data set subportions with other processed data set subportions associated with another data set portion; and return to organizing another data set subportion of the data set portion not yet organized to generate a second set of one or more organized data set subportions.

12. The computer-program product of claim 11, the processor component caused to perform operations including:

for each organized data set subportion of the first set, monitor the availability of a second processing resource and a second storage resource of the node device employed in processing the organized data set subportion; and based on insufficient availability of at least one of the second processing resource and the second storage resource, interrupt the processing of the organized data set subportions of the first set, transmit a subset of the processed data set subportions processed from the first set to the other device, and return to processing each data set subportion of the first set not yet processed.

13. The computer-program product of claim 11, the processor component caused to perform operations including:

before transmission of the one or more processed data set subportions processed from the first set to the other device, determine whether a second set of organized data set subportions has been dispatched to be processed and determine whether the second set is indicated as a continuation of the first set; and transmit the one or more processed data set subportions processed from the first set to the other device based on at least one of a determination that a second set has not been dispatched or that the second set is not a continuation of the first set.

14. The computer-program product of claim 13, based on a determination that the second set has been dispatched and that the second set is marked as a continuation of the first set, the processor component caused to perform operations including:

for each organized data set subportion of the second set, execute the task instructions to process the organized data set subportion; and transmit the processed data set subportions processed from the first set combined with the processed data set subportion processed from the second set to the other device.

15. The computer-program product of claim 11, the processor component caused to perform operations including:

for each data set subportion of the data set portion to be organized into the second set, organize the data set subportion among others of the data set subportions within the data set portion based on the data item and the indicated type of organization, monitor the availability of the first processing resource and the first storage resource, and monitor an amount of data set subportions of the data set portion not yet organized;

based on at least one of insufficient availability of the first processing resource, insufficient availability of the first storage resource or depletion of the amount of data set subportions of the data set portion not yet organized, interrupt the organization of the data set subportions into the second set, and dispatch the second set to be processed;

based on the data item of each of the organized data set subportions of the second set, determine whether the second set is a continuation of the first set; and store an indication that the second set is a continuation of the first set based on the determination.

16. The computer-program product of claim 15, the processor component caused to perform operations including:
instantiate a second thread in which to execute the task instructions to process each organized data set subportion in the second set separately from a first thread in which the task instructions are executed to process each organized data set subportion in the first set based on a determination that the second set is not a continuation of the first set;
for each organized data set subportion of the second set, execute the task instructions within the second thread to process the organized data set subportion; and
transmit the processed data set subportions processed from the second set to the other device.

17. The computer-program product of claim 15, wherein:
the indicated type of organization comprises ordering the data set subportions of the data set portion by the data item; and
the processor component is caused to perform operations including determine whether the second set is a continuation of the first set based on whether a range of values of the data item in each organized data set subportion in the second set intersects with a range of values of the data item in each organized data set subportion in the first set.

18. The computer-program product of claim 15, wherein:
the indicated type of organization comprises grouping the data set subportions of the data set portion into one or more groups that each share a different value for the data item; and
the processor component is caused to perform operations including determine whether the second set is a continuation of the first set based on whether the value shared by a group of one or more organized data set subportions in the second set is also shared by a group of one or more organized data set subportions in the first set.

19. The computer-program product of claim 11, the processor component caused to perform operations including:
receive processed data set subportions from another node device via the network; and
transmit the processed data set subportions processed from the first set combined with the processed data set subportions received from the other node device to the other device.

20. The computer-program product of claim 11, wherein the other device is a storage device that stores a data set that comprises the data set portion and that is to store the one or more processed data set subportions processed from the first set, and the processor component is caused to perform operations including receive the data set portion from the other device.

21. A computer-implemented method comprising:
receiving, at a node device, task instructions to perform a computation with data set subportions within a data set portion as an input to the computation;
retrieving from the task instructions an indication of a type of organization required of the data set subportions prior to performance of the computation and a data item within each data set subportion by which the data set subportions are to be organized, wherein the type of organization comprises at least one of ordering or grouping the data set subportions of the data set portion by the data item;
for each data set subportion of the data set portion, organizing the data set subportion among others of the data set subportions within the data set portion based on the data item and the indicated type of organization, and monitoring an availability of a first processing resource and a first storage resource of the node device employed in organizing the data set subportion;
based on insufficient availability of at least one of the first processing resource or the first storage resource, interrupting the organization of the data set subportions, and dispatching a first set of one or more organized data set subportions to be processed;
for each organized data set subportion of the first set, executing the task instructions to process the organized data set subportion;
transmitting one or more processed data set subportions processed from the first set to another device via a network as part of aggregating the processed data set subportions with other processed data set subportions associated with another data set portion; and
returning to organizing another data set subportion of the data set portion not yet organized to generate a second set of one or more organized data set subportions.

22. The computer-implemented method of claim 21, comprising:
for each organized data set subportion of the first set, monitoring the availability of a second processing resource and a second storage resource of the node device employed in processing the organized data set subportion; and
based on insufficient availability of at least one of the second processing resource and the second storage resource, interrupting the processing of the organized data set subportions of the first set, transmitting a subset of the processed data set subportions processed from the first set to the other device, and returning to processing each data set subportion of the first set not yet processed.

23. The computer-implemented method of claim 21, comprising:
before transmitting the one or more processed data set subportions processed from the first set to the other device, determining whether a second set of organized data set subportions has been dispatched to be processed and determining whether the second set is marked as a continuation of the first set; and
transmitting the one or more processed data set subportions processed from the first set to the other device based on at least one of a determination that a second set has not been dispatched or that the second set is not a continuation of the first set.

24. The computer-implemented method of claim 23, comprising, based on a determination that the second set has been dispatched and that the second set is marked as a continuation of the first set:
  for each organized data set subportion of the second set, executing the task instructions to process the organized data set subportion; and
  transmitting the processed data set subportions processed from the first set combined with the processed data set subportion processed from the second set to the other device.

25. The computer-implemented method of claim 21, comprising:
  for each data set subportion of the data set portion to be organized into the second set, organizing the data set subportion among others of the data set subportions within the data set portion based on the data item and the indicated type of organization, monitoring the availability of the first processing resource and the first storage resource, and monitoring an amount of data set subportions of the data set portion not yet organized;
  based on at least one of insufficient availability of the first processing resource, insufficient availability of the first storage resource or depletion of the amount of data set subportions of the data set portion not yet organized, interrupting the organization of the data set subportions into the second set, and dispatching the second set to be processed;
  based on the data item of each of the organized data set subportions of the second set, determining whether the second set is a continuation of the first set; and
  storing an indication that the second set as a continuation of the first set based on the determination.

26. The computer-implemented method of claim 25, comprising:
  instantiating a second thread in which to execute the task instructions to process each organized data set subportion in the second set separately from a first thread in which the task instructions are executed to process each organized data set subportion in the first set based on a determination that the second set is not a continuation of the first set;
  for each organized data set subportion of the second set, executing the task instructions within the second thread to process the organized data set subportion; and
  transmitting the processed data set subportions processed from the second set to the other device.

27. The computer-implemented method of claim 25, wherein:
  the indicated type of organization comprises ordering the data set subportions of the data set portion by the data item; and
  the method comprises determining whether the second set is a continuation of the first set based on whether a range of values of the data item in each organized data set subportion in the second set intersects with a range of values of the data item in each organized data set subportion in the first set.

28. The computer-implemented method of claim 25, wherein:
  the indicated type of organization comprises grouping the data set subportions of the data set portion into one or more groups that each share a different value for the data item; and
  the method comprises determining whether the second set is a continuation of the first set based on whether the value shared by a group of one or more organized data set subportions in the second set is also shared by a group of one or more organized data set subportions in the first set.

29. The computer-implemented method of claim 21, comprising:
  receiving processed data set subportions from another node device via the network; and
  transmitting the processed data set subportions processed from the first set combined with the processed data set subportions received from the other node device to the other device.

30. The computer-implemented method of claim 21, wherein the other device is a storage device that stores a data set that comprises the data set portion and that is to store the one or more processed data set subportions processed from the first set, the method comprising receiving the data set portion from the other device.

\* \* \* \* \*